United States Patent [19]

Usami et al.

[11] Patent Number: 5,682,505
[45] Date of Patent: Oct. 28, 1997

[54] METHOD AND APPARATUS FOR GENERATING AN IMAGE

[75] Inventors: Yoshiaki Usami, Hitachi; Joji Nishiyama, Urawa; Tomoyuki Miyata, Kokubunji; Hiroaki Takatsuki, Tokyo; Yoshimi Ota, Mito; Masao Yanaka, Hitachi, all of Japan

[73] Assignee: Hitachi, Ltd., Tokyo, Japan

[21] Appl. No.: 428,447

[22] Filed: Apr. 25, 1995

Related U.S. Application Data

[63] Continuation of Ser. No. 165,584, Dec. 13, 1993, abandoned, which is a continuation of Ser. No. 564,139, Aug. 8, 1990, abandoned.

[30] Foreign Application Priority Data

Aug. 25, 1989 [JP] Japan ..................... 1-217357
Nov. 28, 1989 [JP] Japan ..................... 1-306567

[51] Int. Cl.$^6$ ..................................... G06T 7/00
[52] U.S. Cl. ........................................... 395/118
[58] Field of Search .......................... 395/118, 128, 395/130, 132, 900; 364/419

[56] References Cited

U.S. PATENT DOCUMENTS 4,743,959  5/1988  Frederiksen ................. 358/11
4,864,502  9/1989  Kucera et al. ................ 364/419

FOREIGN PATENT DOCUMENTS

0122082A3  10/1984  European Pat. Off. .
2231760A    4/1990  United Kingdom .

OTHER PUBLICATIONS

"Proceedings of the ACM SIGGRAPH Symposium on User Interface Software (1988)" Lofti A. Zadeh.
"Fuzzy Logic", Apr. 1988, p. 84.

Primary Examiner—Phu K. Nguyen
Assistant Examiner—Cliff N. Vo
Attorney, Agent, or Firm—Antonelli, Terry, Stout & Kraus, LLP.

[57] ABSTRACT

In order to generate an image, modelling data representing image features of the image are stored in a data base, and first characteristics, such as colors, are stored in another data base. An analyzer unit is then able to assign the first characteristics to the image features in an objective way. Subjective properties, e.g. 'darker', 'lighter', are also defined over a range for the image features and a user interface permits a user to select an appropriate value of the subjective property within the range, thereby to generate a second characteristic on the basis of rules relating to the subjective properties stored in a data base. An interpreter unit then modifies the first characteristic on the basis of the second characteristic before the selected image features are rendered into an image by a rendering unit for display by a display unit. There is also disclosed an arrangement for associating characteristics of image feature on the basis of an ordered relationship of other characteristics of the image features, preferably making use of a reference image to derive the characteristics to be associated.

20 Claims, 29 Drawing Sheets

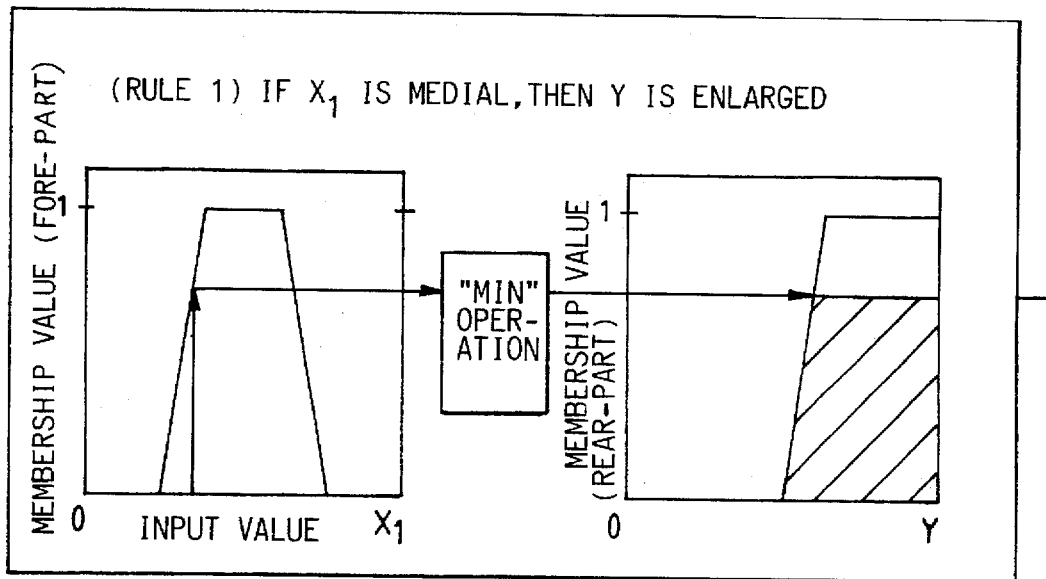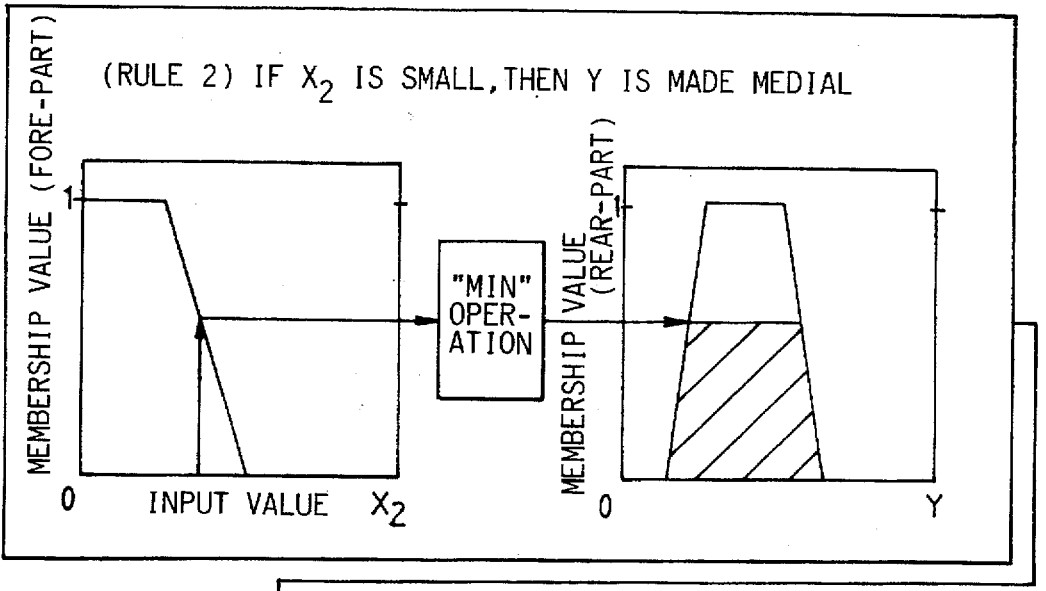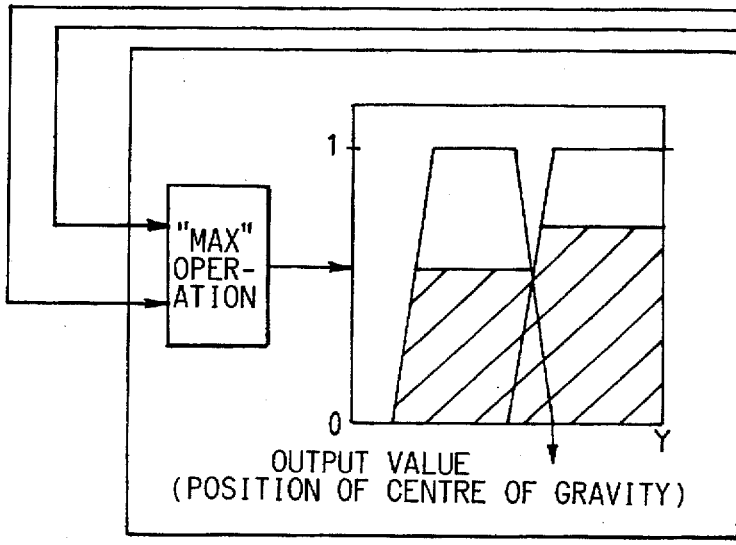
FIG.5

FIG.7
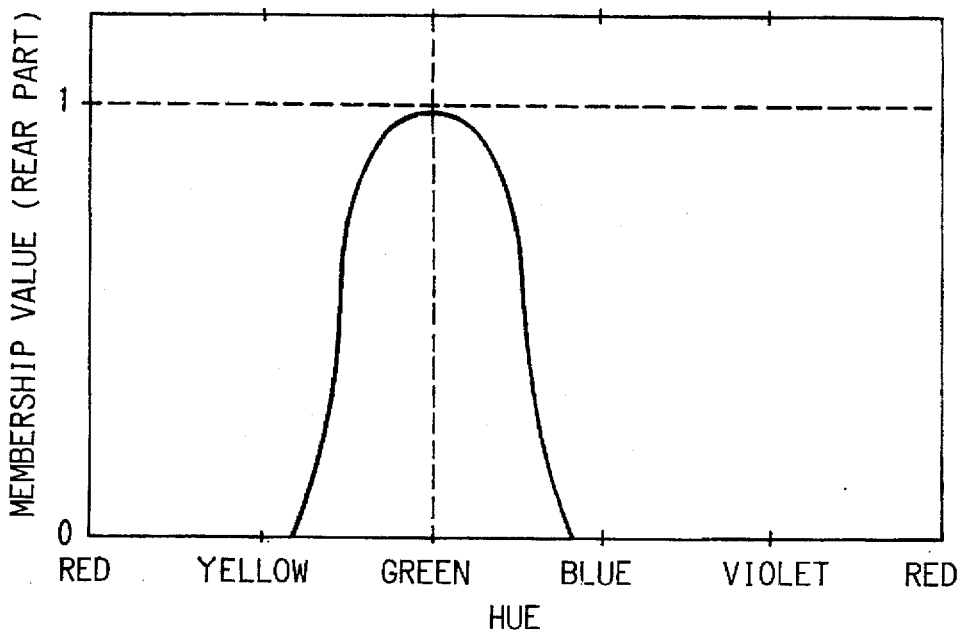
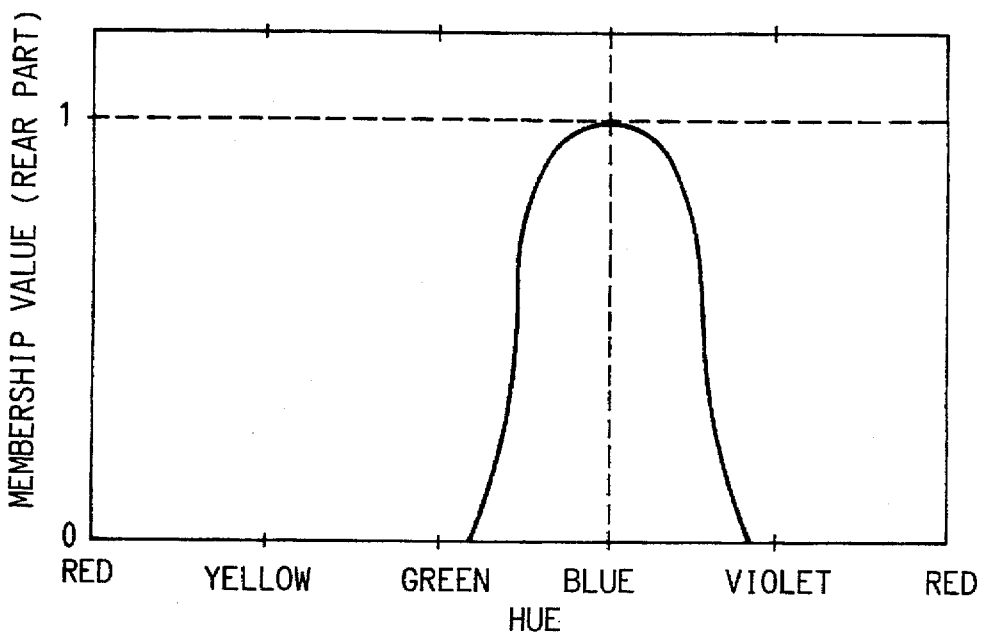

FIG.12

| SAMPLE NOS. \ PARAMETERS | HUE | LIGHTNESS | SATURATION |
|---|---|---|---|
| 1 | $\alpha_1$ | $\beta_1$ | $\gamma_1$ |
| 2 | $\alpha_1$ | $\beta_1$ | $\gamma_2$ |
| 3 | $\alpha_1$ | $\beta_1$ | $\gamma_3$ |
| 4 | $\alpha_1$ | $\beta_2$ | $\gamma_1$ |
| 5 | $\alpha_1$ | $\beta_2$ | $\gamma_2$ |
| 6 | $\alpha_1$ | $\beta_2$ | $\gamma_3$ |
| 7 | $\alpha_1$ | $\beta_3$ | $\gamma_1$ |
| 8 | $\alpha_1$ | $\beta_3$ | $\gamma_2$ |
| 9 | $\alpha_1$ | $\beta_3$ | $\gamma_3$ |
| 10 | $\alpha_2$ | $\beta_1$ | $\gamma_1$ |
| 11 | $\alpha_2$ | $\beta_1$ | $\gamma_2$ |
| 12 | $\alpha_2$ | $\beta_1$ | $\gamma_3$ |
| 13 | $\alpha_2$ | $\beta_2$ | $\gamma_1$ |
| 14 | $\alpha_2$ | $\beta_2$ | $\gamma_2$ |
| 15 | $\alpha_2$ | $\beta_2$ | $\gamma_3$ |
| 16 | $\alpha_2$ | $\beta_3$ | $\gamma_1$ |
| 17 | $\alpha_2$ | $\beta_3$ | $\gamma_2$ |
| 18 | $\alpha_2$ | $\beta_3$ | $\gamma_3$ |
| 19 | $\alpha_3$ | $\beta_1$ | $\gamma_1$ |
| 20 | $\alpha_3$ | $\beta_1$ | $\gamma_2$ |
| 21 | $\alpha_3$ | $\beta_1$ | $\gamma_3$ |
| 22 | $\alpha_3$ | $\beta_2$ | $\gamma_1$ |
| 23 | $\alpha_3$ | $\beta_2$ | $\gamma_2$ |
| 24 | $\alpha_3$ | $\beta_2$ | $\gamma_3$ |
| 25 | $\alpha_3$ | $\beta_3$ | $\gamma_1$ |
| 26 | $\alpha_3$ | $\beta_3$ | $\gamma_2$ |
| 27 | $\alpha_3$ | $\beta_3$ | $\gamma_3$ |

FIG.13

| ADJECTIVE PAIR NOS. | ADJECTIVE PAIRS FACTOR | I FACTOR LOAD AMOUNTS | II FACTOR LOAD AMOUNTS | III FACTOR LOAD AMOUNTS |
|---|---|---|---|---|
| 5 | STRONG — WEAK | $a_1$ | $b_5$ | $c_4$ |
| 4 | SHARP — DIM | $a_2$ | $b_9$ | $c_8$ |
| 2 | BOLD — DELICATE | $a_3$ | $b_{10}$ | $c_5$ |
| 10 | LIVELY — QUIET | $a_4$ | $b_8$ | $c_6$ |
| 1 | BRIGHT — DARK | $a_7$ | $b_1$ | $c_{10}$ |
| 8 | NEW — OLD | $a_5$ | $b_2$ | $c_9$ |
| 3 | WARM — COLD | $a_9$ | $b_3$ | $c_7$ |
| 9 | SHALLOW — DEEP | $a_{10}$ | $b_6$ | $c_1$ |
| 6 | SIMPLE — COMPLICATED | $a_8$ | $b_4$ | $c_2$ |
| 7 | LIGHT — HEAVY | $a_6$ | $b_7$ | $c_3$ |
| | SETTLEMENTS OF FACTORS | IMPRESSION OF ACTIVITY | IMPRESSION OF EXPANSION | IMPRESSION OF COMPLICATION |

FIG.14

| FACTORS | ADJECTIVE PAIR NOS. | PARAMETERS / ADJECTIVE PAIRS | HUE (CORRELATION COEFFICIENTS) | LIGHTNESS (CORRELATION COEFFICIENTS) | SATURATION (CORRELATION COEFFICIENTS) |
|---|---|---|---|---|---|
| IMPRESSION OF ACTIVITY | 5 | STRONG — WEAK | $d_5$ | $e_3$ | $f_9$ |
| | 4 | SHARP — DIM | $d_1$ | $e_4$ | $f_5$ |
| | 2 | BOLD — DELICATE | $d_8$ | $e_9$ | $f_2$ |
| | 10 | LIVELY — QUIET | $d_3$ | $e_1$ | $f_6$ |
| IMPRESSION OF EXPANSION | 1 | BRIGHT — DARK | $d_2$ | $e_7$ | $f_3$ |
| | 8 | NEW — OLD | $d_9$ | $e_{10}$ | $f_{10}$ |
| | 3 | WARM — COLD | $d_{10}$ | $e_8$ | $f_7$ |
| | 9 | SHALLOW — DEEP | $d_4$ | $e_5$ | $f_8$ |
| IMPRESSION OF COMPLICATION | 6 | SIMPLE — COMPLICATED | $d_7$ | $e_2$ | $f_1$ |
| | 7 | LIGHT — HEAVY | $d_6$ | $e_6$ | $f_4$ |

FIG.16
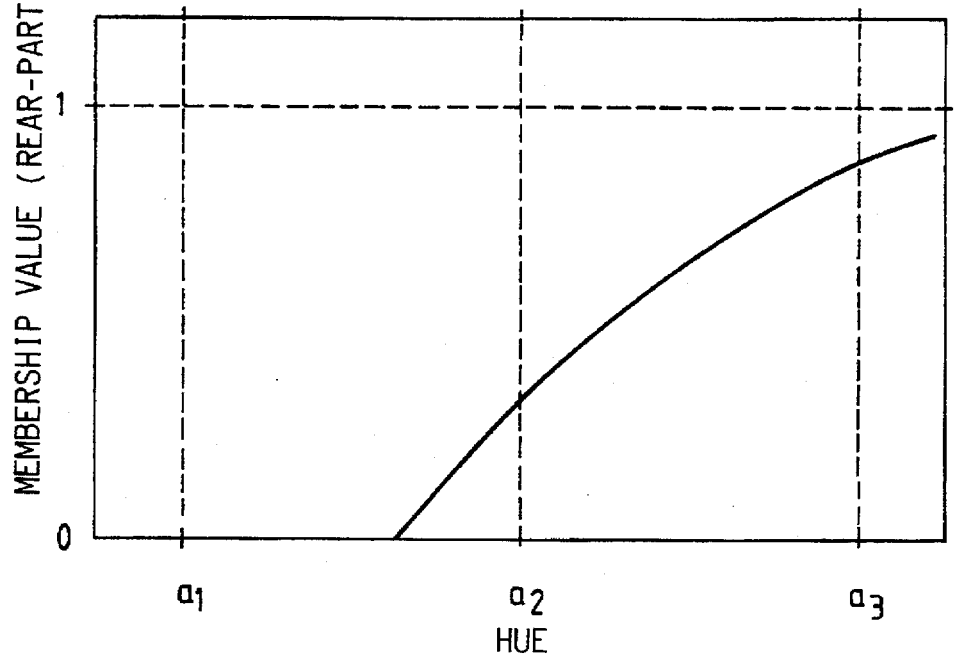
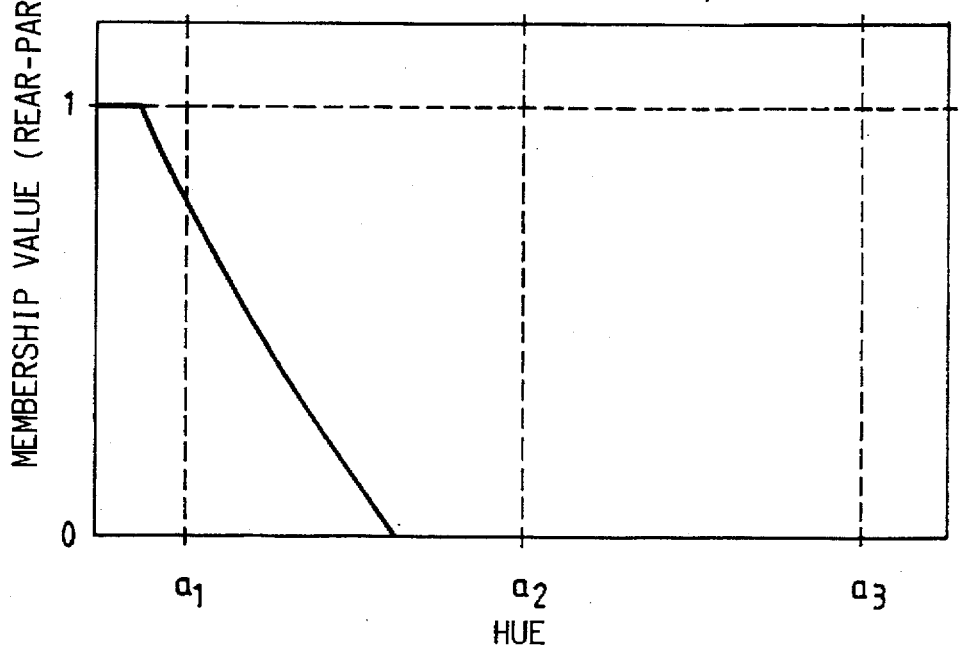

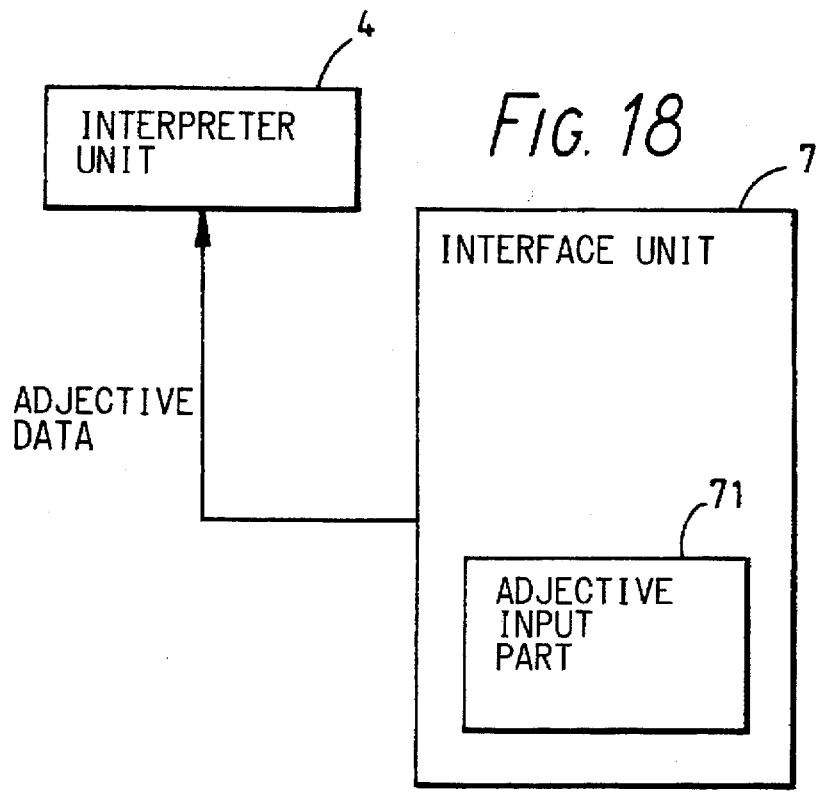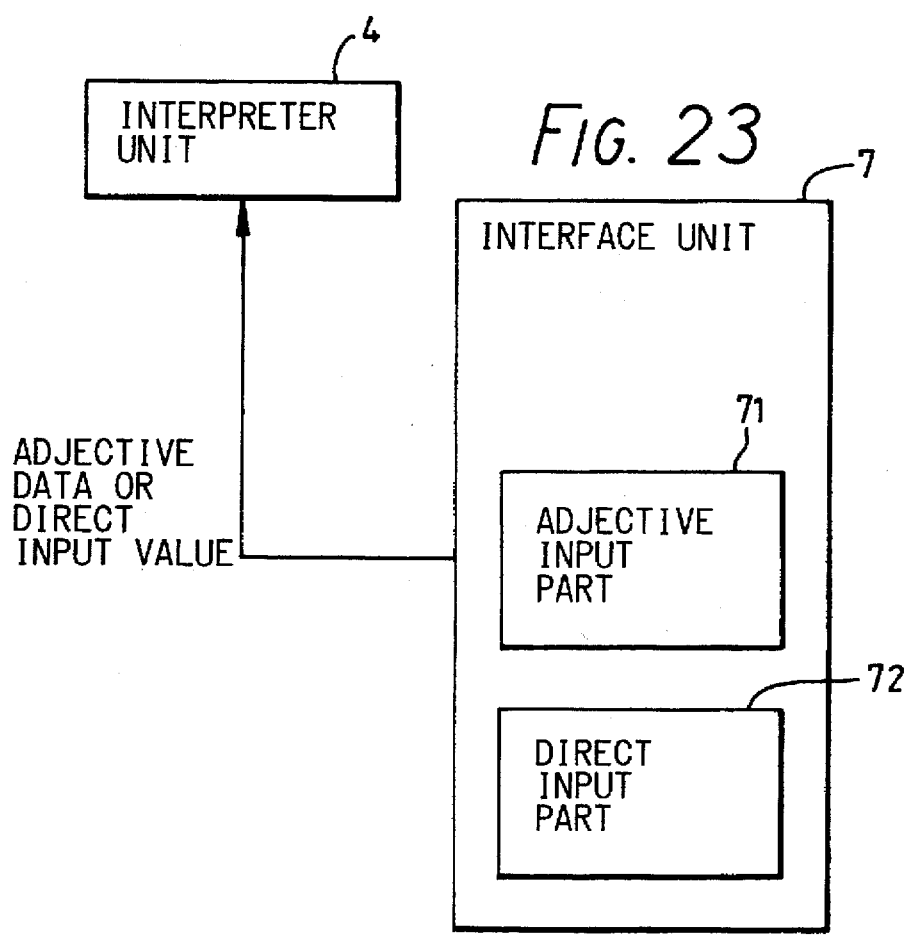

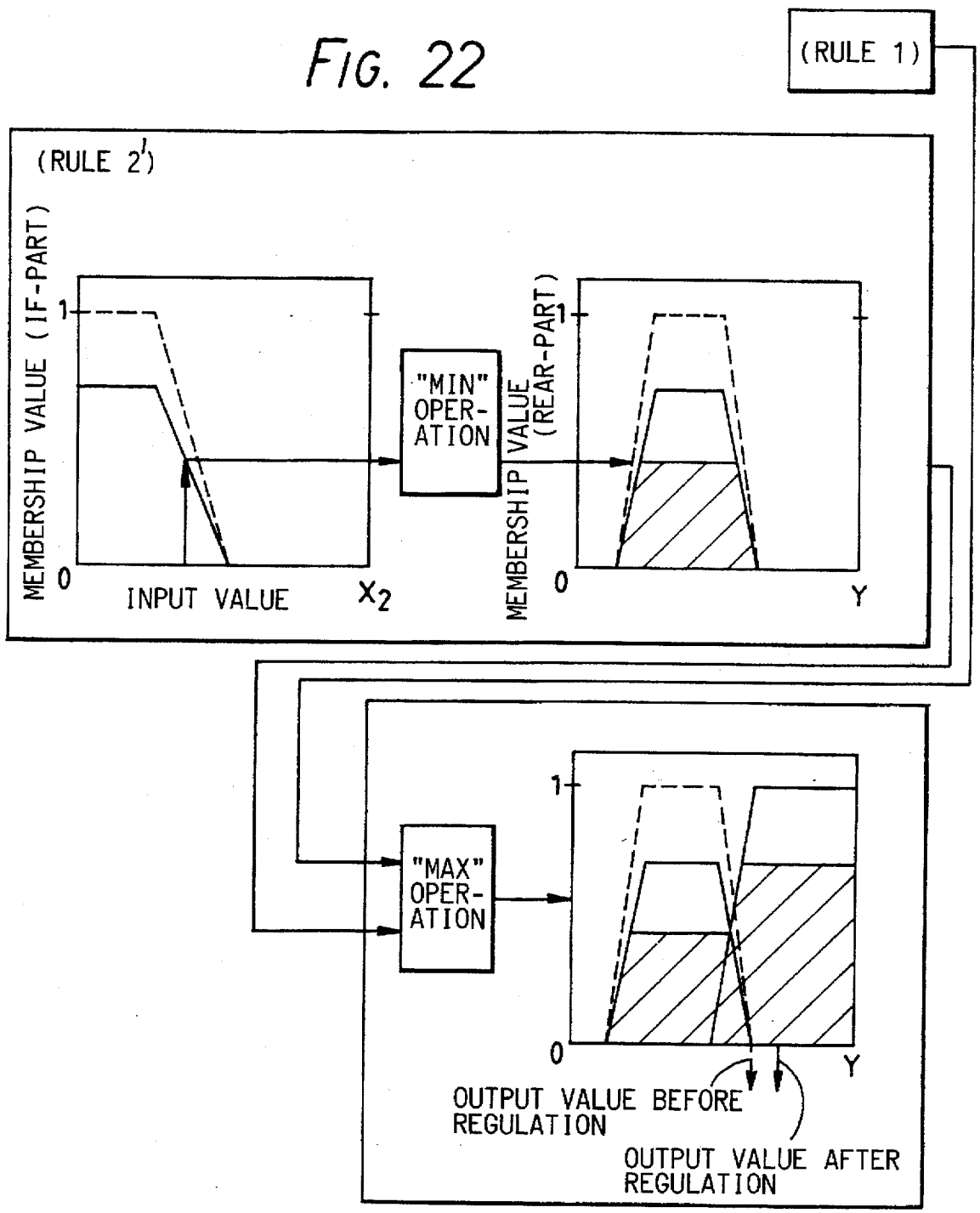

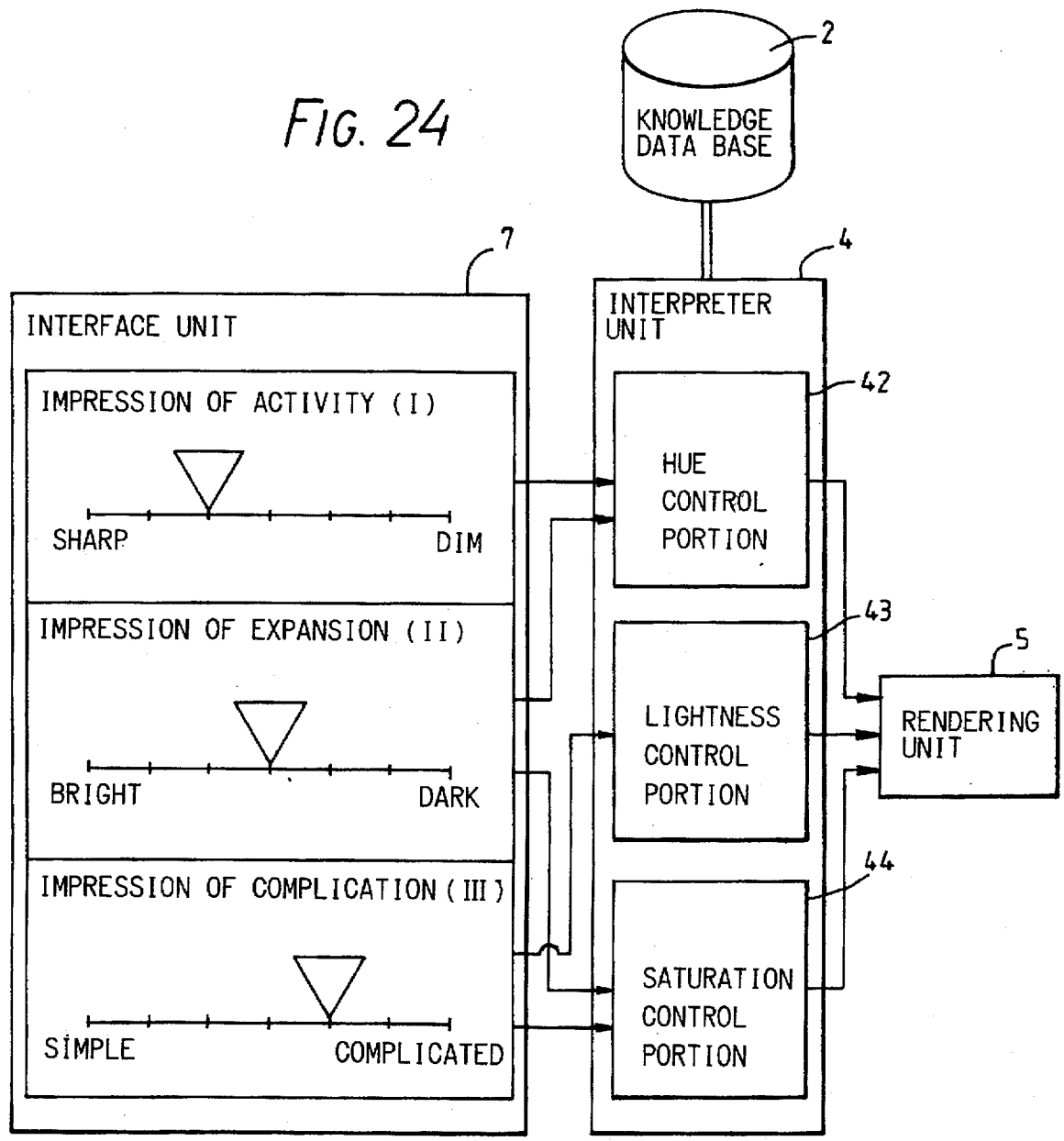

| ADJECTIVE PAIR DISPLAY PORTION | | DISPLAY SCREEN |
|---|---|---|
| STRONG | WEAK | |
| SHARP | DIM | |
| BOLD | DELICATE | |
| LIVELY | QUIET | |
| BRIGHT | DARK | |
| SHALLOW | DEEP | |
| SIMPLE | COMPLICATED | |
| | | |
| | | |
| | | |
| | | |
| | | |

84

METHOD AND APPARATUS FOR GENERATING AN IMAGE

This application is a continuation of application Ser. No. 08/165,584, filed Dec. 13, 1993, now abandoned, which is a continuation of application Ser. No. 07/564,139, filed on Aug. 8, 1990, now abandoned.

BACKGROUND OF THE INVENTION

1. Field of the Invention

The present invention relates to a method of generating images. It is particularly, but not exclusively, concerned with the application of such image generation to computer graphics.

2. Summary of the Prior Art

In a conventional computer graphics arrangement, particularly for three-dimensional graphics, there are normally two separate steps. Firstly, data relating to individual features of the image to be created are stored. Such data is known as modelling data, and represents the raw material from which the graphics designer must work. Thus, modelling data may define specific shapes, surface textures, specific colours, etc. Secondly, in order to obtain an image, such modelling data is processed, or rendered, to generate the desired image. The rendering operation combines together the various modelling data, in the way desired, in order to achieve the correct effect. However, the problem is that such a rendering operation requires all the information and instructions for the rendering operation to be determined and entered by a user. As can be imagined, this requires a very long time, since the number of combinations of the modelling data are virtually limitless, and the user must select exactly the correct combination desired. Thus, to take colour as an example, whilst specific colours may be stored as modelling data, the user must select from that modelling data the exact item of that data which defines a specific colour, if that colour is to be presented as the colour of an object.

Some image generating systems have tried to address this problem, but in general have addressed only part of the problem. For example, in the article entitled "Proceedings of the ACM SIGGRAPH Symposium on User Interface Software (1988)", pages 117–128, an arrangement was discussed in which specific image data, being e.g. windows, icons and colours of text, in a computer display, were associated with specific colours on the basis of predetermined artistic rules. However, the user had no control over the way that those colours were assigned.

In "Ningen-Kogaku", Volume 22, No. 1, (1986), pages 1–7, there was discussed a method for generating images relating to interior decoration, in which it was possible for the user to vary the colours of objects but only on the basis of a global change to that colour for all the image.

It is also known to define a colour palette for the creation of an image, from which colour palette specific colours can be selected by the user. The colour palette is stored in a memory, and may be displayed to the user. Of course, the user cannot then express his choice except in terms of selection from that palette. An example of such an arrangement is disclosed in JP-A-63-90284. Of course, the problem with such an arrangement is that the choice is then limited to those colours stored and displayed in the palette, which may be satisfactory if only a limited range of colours is desired, but it is clearly impractical to present every possible colour as part of a palette. Furthermore, this means that every colour needed must be stored in terms of modelling data, which is also difficult.

SUMMARY OF THE INVENTION

The inventors of the present invention have appreciated that, in general, some characteristics of the modelling data can be associated with specific items of the modelling data in an objective way, whilst others are subjective. At its most general, and in a first aspect, the present invention proposes that object characteristics are assigned automatically, but those characteristics may be varied on the basis of the selection of at least one subjective characteristic, the or each of which subjective characteristic may vary over a range.

In order to understand the present invention, consider the case where colours are to be assigned to image features for an image, which are stored as modelling data. Then, it is possible to associate with those image features, specific colours which may be objectively assigned to the image feature. Thus, the colour blue could be assigned to the sea, the colour green to mountains, etc. However, any automatic system for assigning those colours must inevitably select a specific colour, and whilst that could be the correct one for a particular use, it is more likely that the user will find it unsatisfactory. However, the user may be able to define what change is needed only in terms of subjective characteristics, i.e. by such terms as "darker" or "lighter" or even by less directly colour-related subjective characteristics as "shallow" or "deep". Then, the present invention proposes that one or more of such subjective properties be defined, and permitted to vary over a range, and the user can then select where within that range a second characteristic of the colour is to lie, which second characteristic can then be used to modify the first characteristic, i.e. the characteristic which is pre-established in the computer.

It can thus be appreciated that it is possible to adjust the effect of the user selection in dependence on the object itself. Thus, for example, the range of colour variation for the sea may be greater than that permitted for the sky, even though both could be defined as "blue". Then, the computer system would first automatically select a median within the permitted range, and the user could then select from a range expressed only in subjective terms a second characteristic, and that second characteristic could then be used to vary the original colour, within its range. An example of this would be to say that if the user selected the characteristic "very dark" this could produce a different blue for the sea and the sky respectively, since the colour characteristics associated with the image features "sea" and "sky" could have different permitted ranges.

It is thus of fundamental importance in the present invention that some characteristics of an object may be pre-set in an objective way, and related characteristics varied in a subjective way. This concept of division of characteristics is fundamental to the present invention, but has not been fully considered by existing image generation systems. Therefore, in the present specification, it is necessary to develop a terminology for referring to various concepts.

Firstly, the term "image features" has been used, and these represent the basic components of an image, which are to be assembled in a rendering operation, and they are defined by modelling data. Thus, "sea", "mountain" may be considered to be image features.

Secondly, as discussed above, there are the objective characteristics which may be assigned, preferably as ranges, to those image features, in a subjective way. Thus a range of possible colours for the "sky" may be defined, in a pre-set way. These will be referred to as "objective" characteristics.

An objective characteristic may then be combined with an image feature to create a "noun". A "noun" corresponds to the logical statement "the sea is blue", "the mountain is green" etc.

Then, there are subjective properties which can be applied, and which will vary over a subjective range "bright to dark", "heavy to light" etc. The present invention, as discussed above, proposes that the user be able to select a point within that range, which will then define a second characteristic, which is a subjective characteristic. Thus "very bright" or "very dark" represent subjective characteristics which may be applied as "adjectives" to the nouns.

Normally, the modification of the nouns by the adjectives will be computer controlled, and therefore it is also necessary to refer to the computer operations which define the nouns and adjectives. Thus the term "reference parameter" is used to define the computer processing operations which are associated with the objective characteristics i.e. those computer operations necessary to define the nouns, and the term "corrected parameter" is used to define the modified computer operation which is produced when an adjective modifies the noun associated with that reference parameter.

Finally, the term "rendering" is used to define the operation which expresses the nouns and adjectives as a final image, i.e. the operative which assembles the image from the image features on the basis of the subjective and objective characteristics.

Of course, the discussion above has assumed that the characteristics are all colour-related. This is a particularly advantageous application of the present invention, because although specific colours are defined by colour scales (and so colours are capable of being stored in a computer), variations from one colour to another are difficult to express, except in subjective terms. However, the present invention is applicable not only to colour-related characteristics, but to other characteristics of an image. For example, if the image is of a walking figure, it may be possible to modify the pattern of that walk in terms of the subjective characteristics "sad", "happy", etc. with those characteristics then permitting a variation in the walking pattern of the figure in a way that meets the subjective requirements, but is still within the range of human possibilities.

So far, it has been assumed that all the "adjectives" that are applied are wholly subjective. In practice, this may not always be the case. Again, for the example of colour, some additional rules may be defined such as "contrasting", which may be pre-defined by existing artistic patterns and are generally referred to as "art knowledge". These may be combined with the subjective adjectives e.g. "contrasting and brighter".

The present invention has a further aspect, in which image features are ordered according to a first characteristic which may be expressed as a sequence (e.g. size), and that characteristic may then be used to assign other characteristics (e.g. colour). Thus, if a particularly harmonious colour balance has been achieved, due to the relative size of image features in an image, those colours and relative sizes may be stored and applied to other image features, to generate a similarly harmonious image when the second set of image features are rendered.

This is applicable, for example, to the case where an existing image is scanned to obtain the characteristics of that image (e.g. colour, feature area etc.), and that data is then stored to be applied to other image features.

DETAILED DESCRIPTION

Embodiments of the present invention will now be described, by way of example, with reference to the accompanying drawings in which:

FIG. 5 is a diagram illustrating fuzzy inference procedures;

FIG. 7 illustrates examples of noun rules;

FIG. 12 illustrates parameters which are to be evaluated;

FIG. 13 illustrates factor load amounts;

FIG. 14 illustrates examples of correlation coefficients for parameters;

FIG. 16 illustrates subjective scale rules;

FIG. 18 shows in more detail the interface unit of FIG. 1;

FIG. 22 illustrates the operation of the rule regulating mechanism;

FIG. 23 shows a further modification in which there is a direct input part;

FIG. 24 illustrates the operation of the direct input part;

Figures 25, 30:
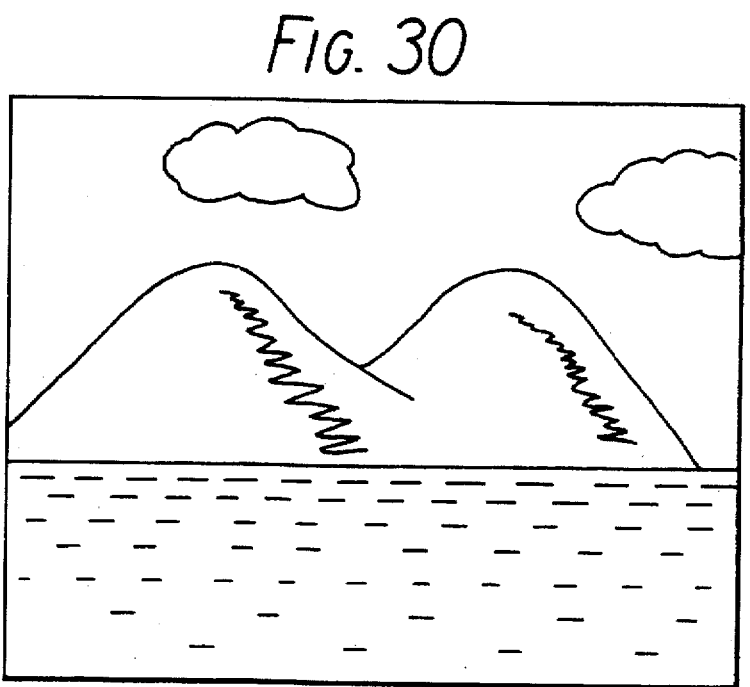
FIG. 25 illustrates a further modification in which only restricted adjectives are to be used.
Figure 26:
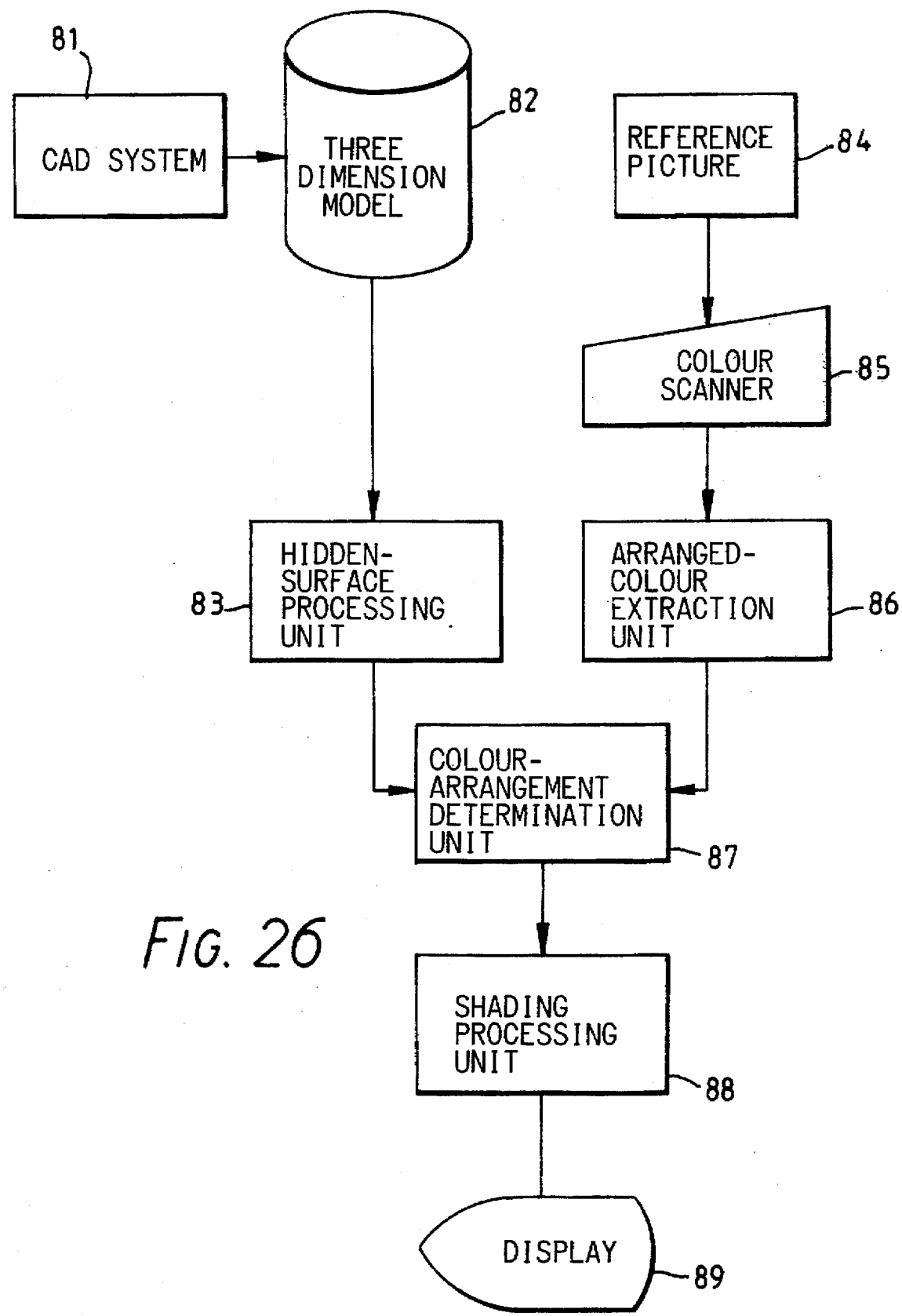
FIG. 26 is a block diagram of a further embodiment of the present invention.
Figure 27A:
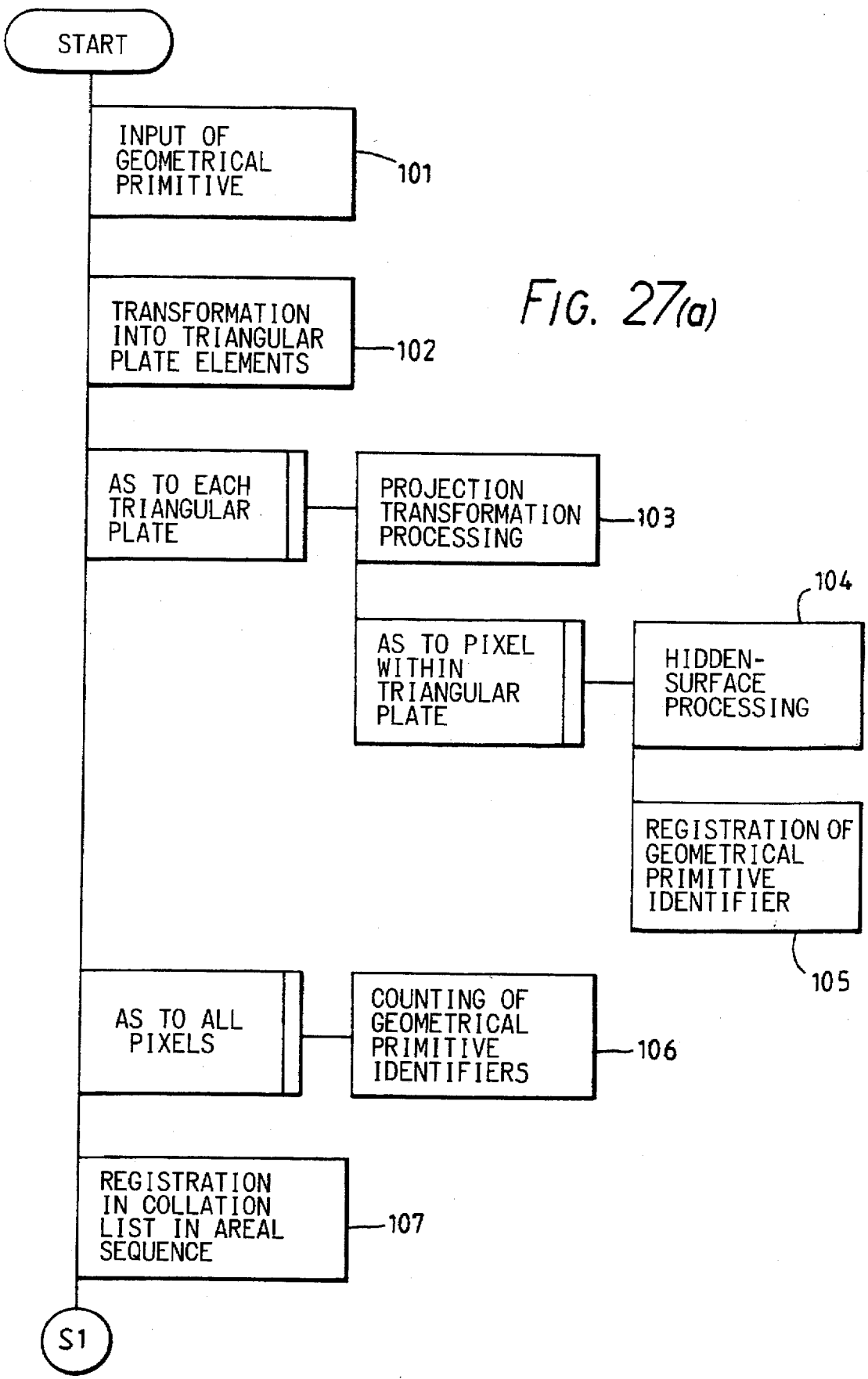
Figure 28:
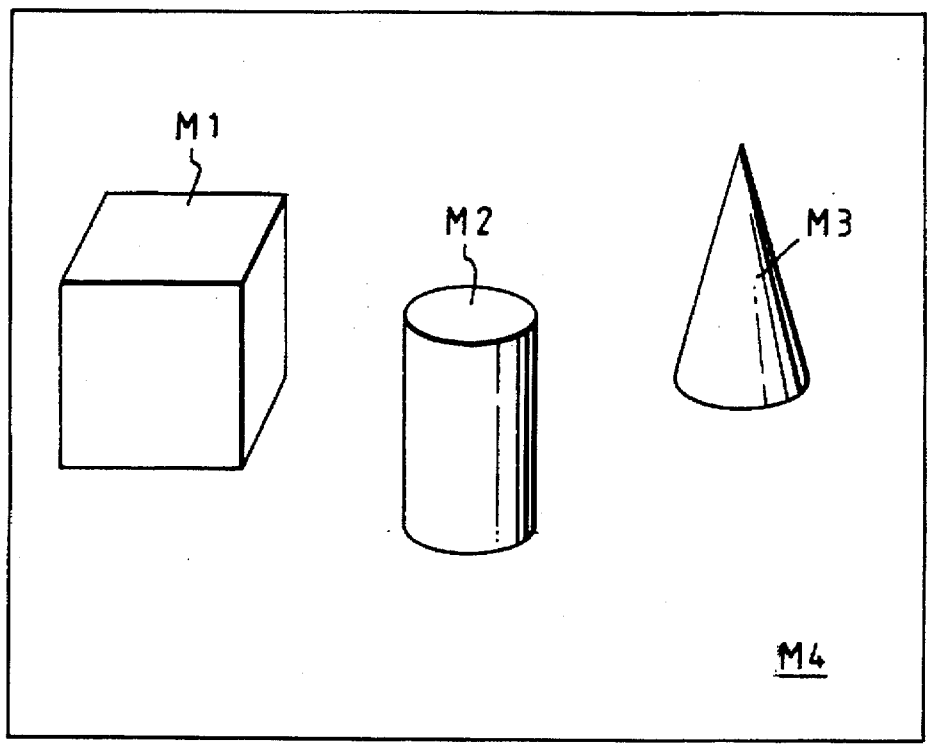
Figure 29:
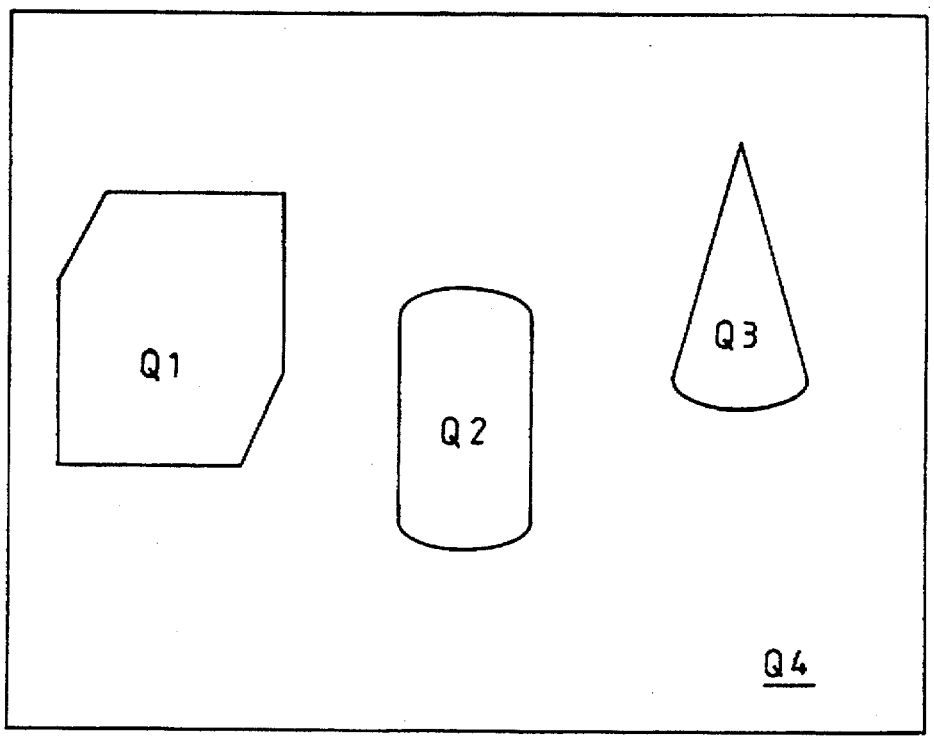
Figure 31:
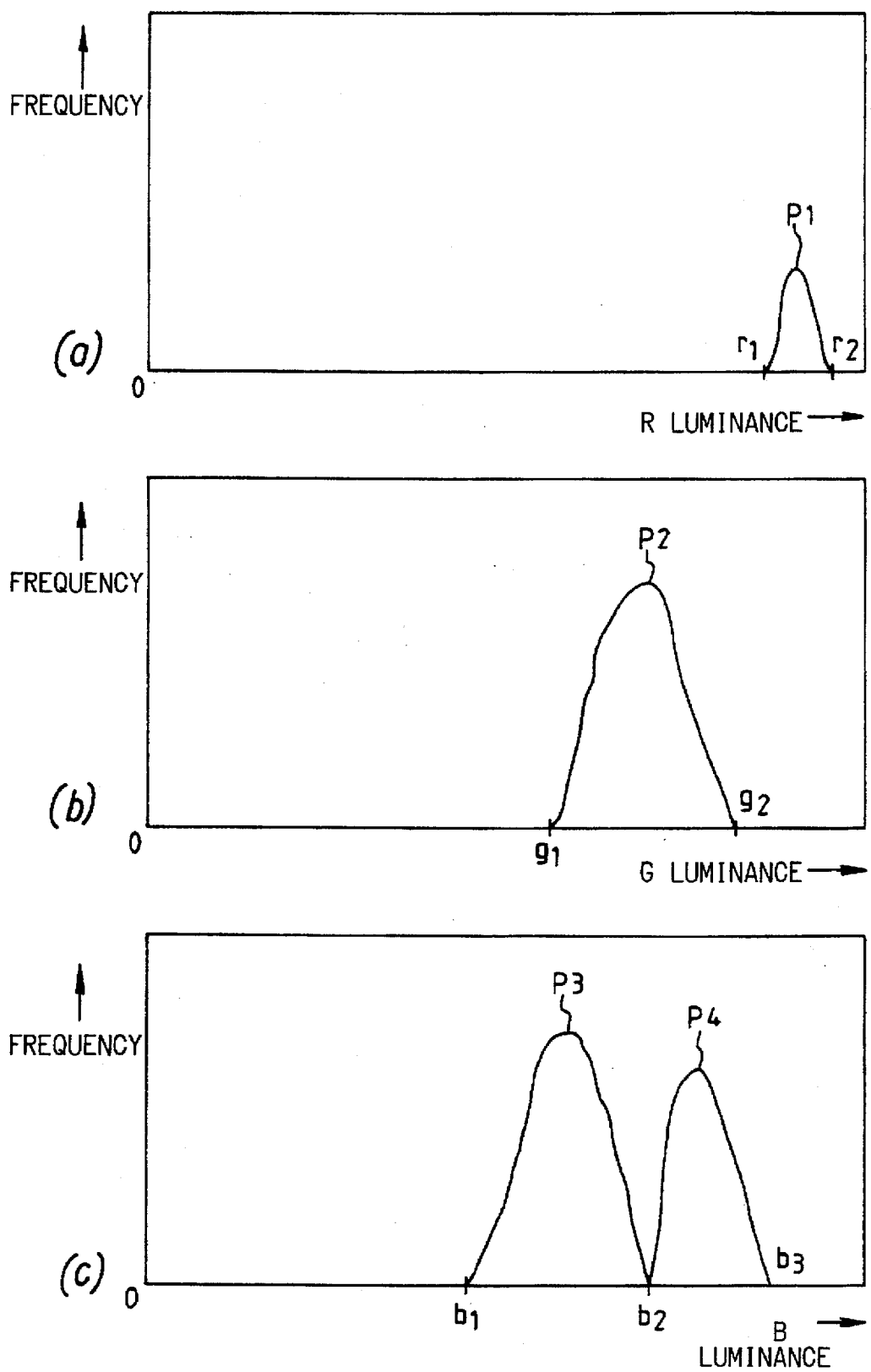
Figure 32:
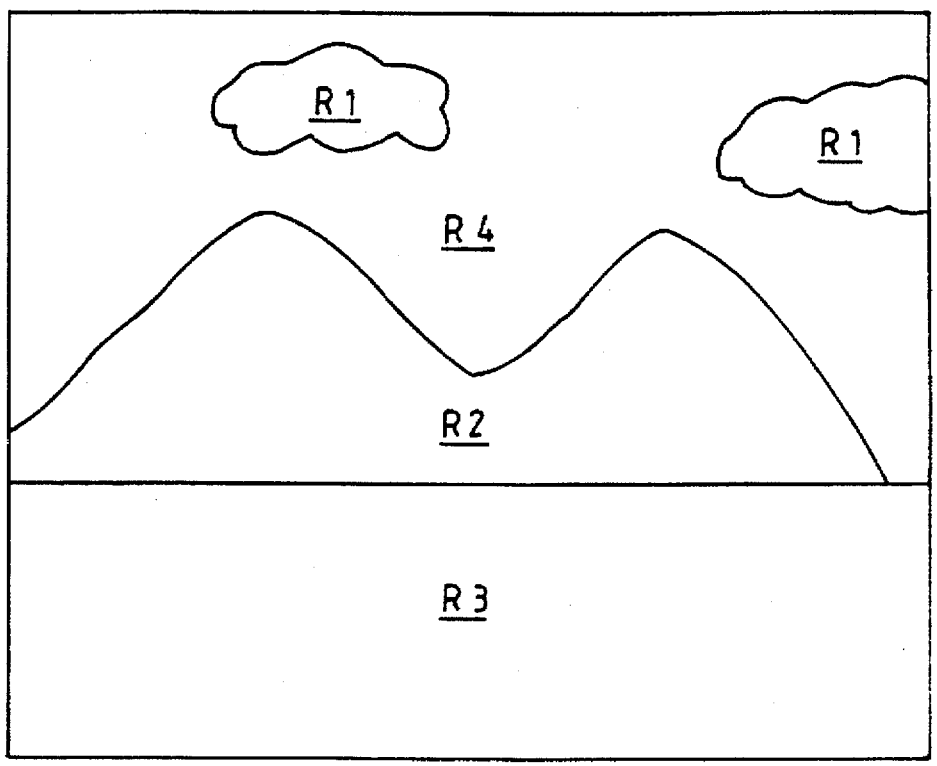
Figure 33:
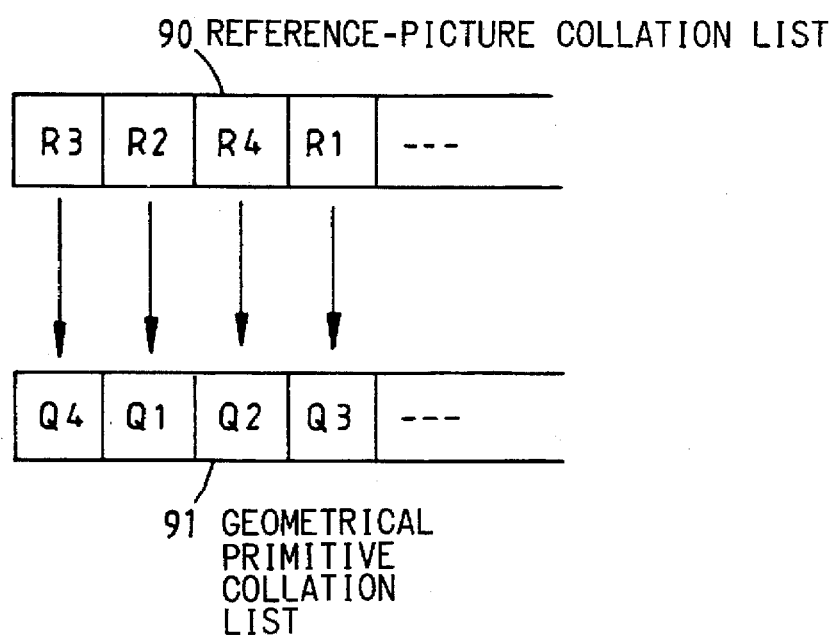
Figure 34:
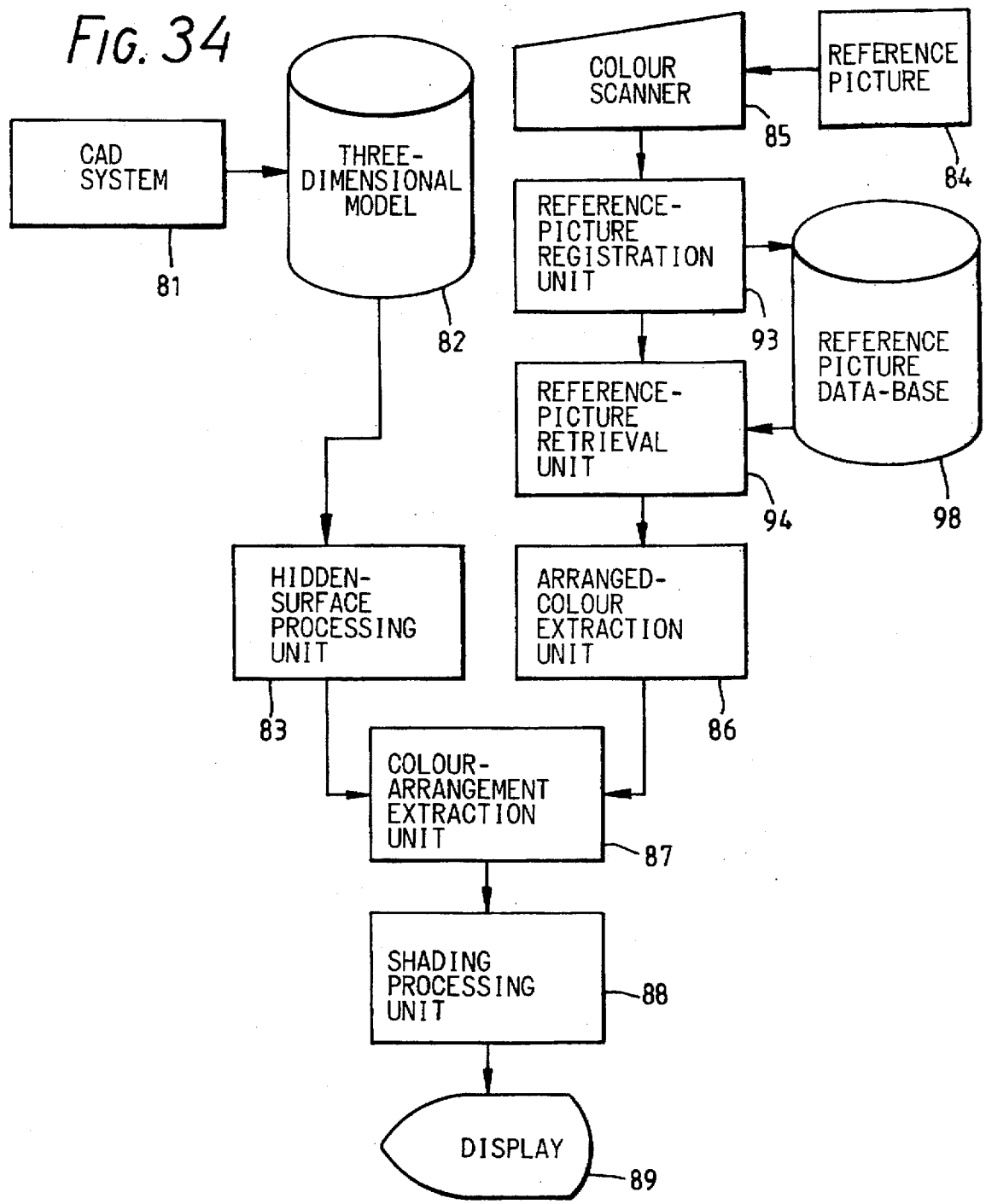

FIGS. 27(a) and (b) are flow charts showing the operation of the embodiment of FIG. 26;

FIG. 28 illustrates a three-dimensional model;

FIG. 29 corresponds to the model of FIG. 28, but reduced to two-dimension;

FIG. 30 is a picture which may be used with the embodiments of FIG. 26;

FIG. 31 shows graphs of analyzed features of the picture of FIG. 30;

FIG. 32 illustrates the analysis of the picture of FIG. 30;

FIG. 33 shows the assignment relationship used in the arrangement of FIG. 26;

FIG. 34 shows a modification of the embodiment shown in FIG. 26; and

Figure 35:
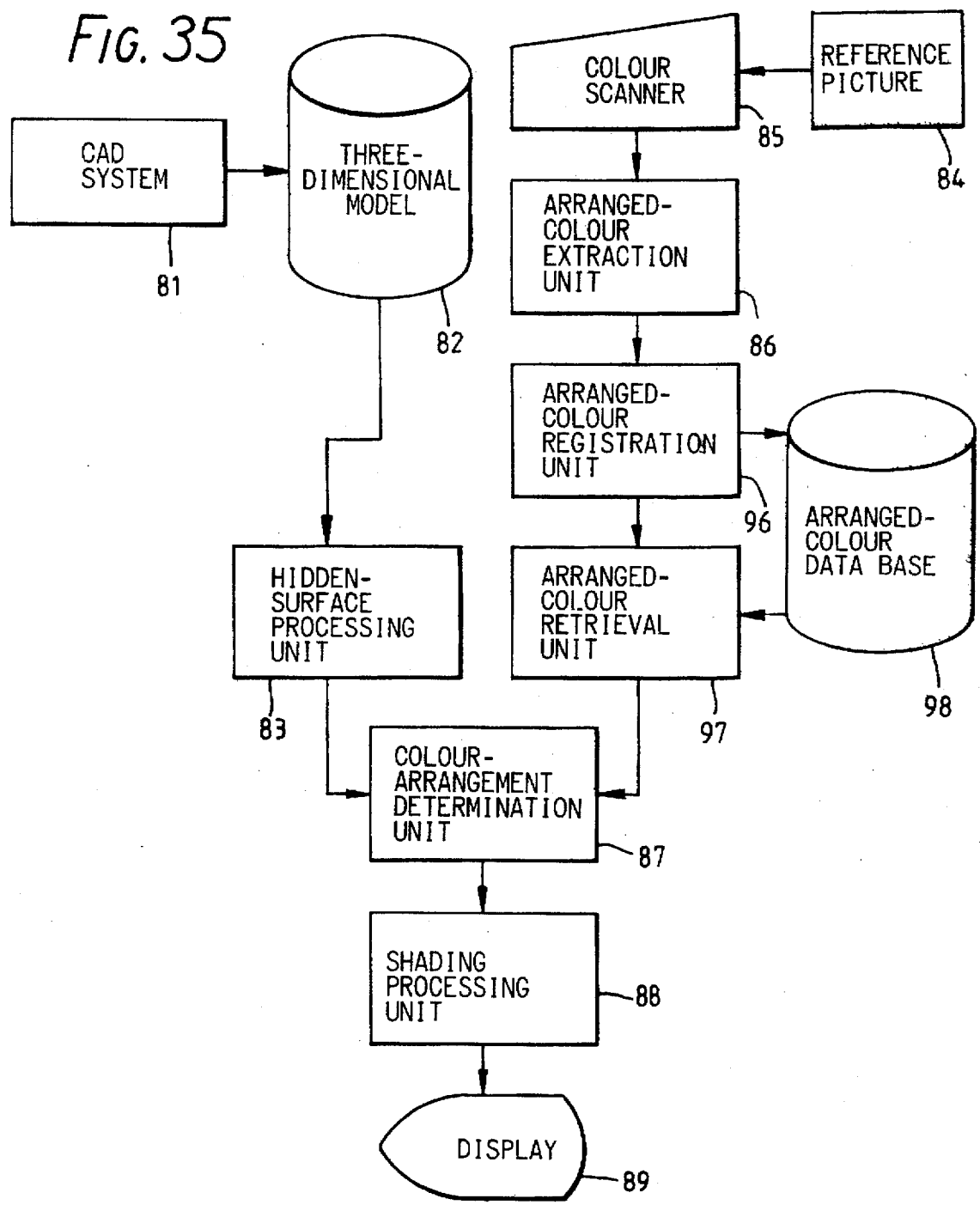

FIG. 35 is a further modification of the embodiment shown in FIG. 26.

DETAILED DESCRIPTION

A first embodiment of the present invention will now be described with reference to FIG. 1. The general operation of the embodiment will be discussed first, and the operations carried out by individual components of the embodiment will be discussed in more detail later.

As in known methods of rendering, any or all of the modelling data, being data relating to shapes and movements of components of an image are stored in a modelling data base 1, are subjected to a rendering operation by a rendering unit 5 and are delivered to a display unit 6 in the form of image information so as to permit an image to be displayed. However, in this series of processing steps, the present invention is particularly concerned with determination of parameters which are to be input to the rendering unit 5.

Figure 1:
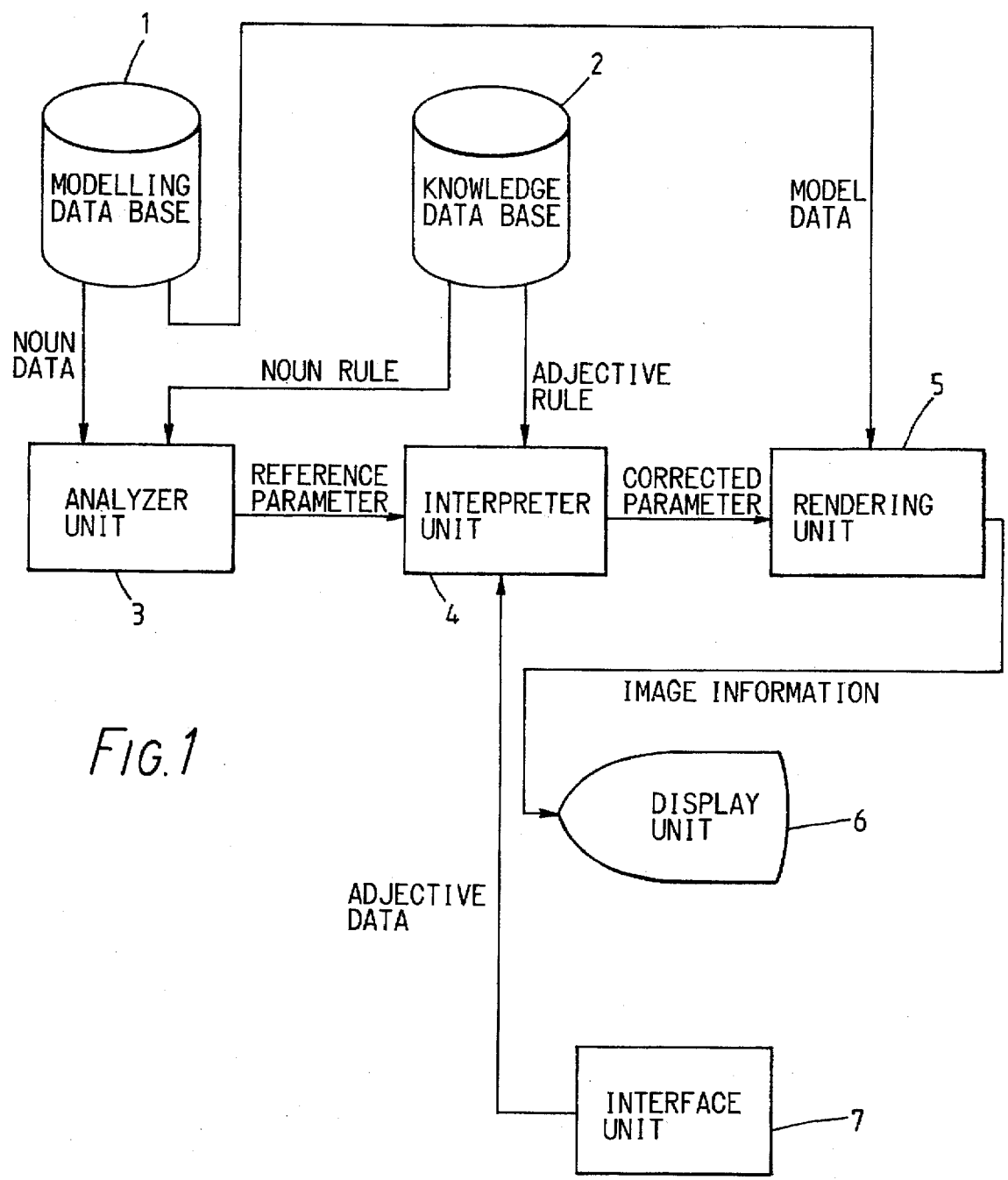
FIG. 1 shows a first embodiment of an image generation apparatus according to the present invention.

As shown in FIG. 1, an analyzer unit 3 first extracts noun data from the modelling data base 1 and converts it into a reference parameter by applying a noun rule contained in a knowledge data base 2. Subsequently, an interpreter unit 4 receives the reference parameter from the analyzer unit 3 and adjective data from an interface unit 7 and converts them into a corrected parameter by applying an adjective rule in the knowledge data base 2. Then, the rendering unit 5 receives modelling data from the modelling data base 1 and the corrected parameter from the interpreter unit 4 and subjects that modelling data to a rendering operation so as to deliver the image information to the display unit 6. Finally, an image is obtained.

The operations of the respective units in FIG. 1 will now be described in detail. Furthermore, as the parameters to be input to the rendering unit 5 include colour parameters, texture parameters, composition parameters, illumination parameters, etc. a method of determining colour parameters will be explained below as an example.

Figure 2:
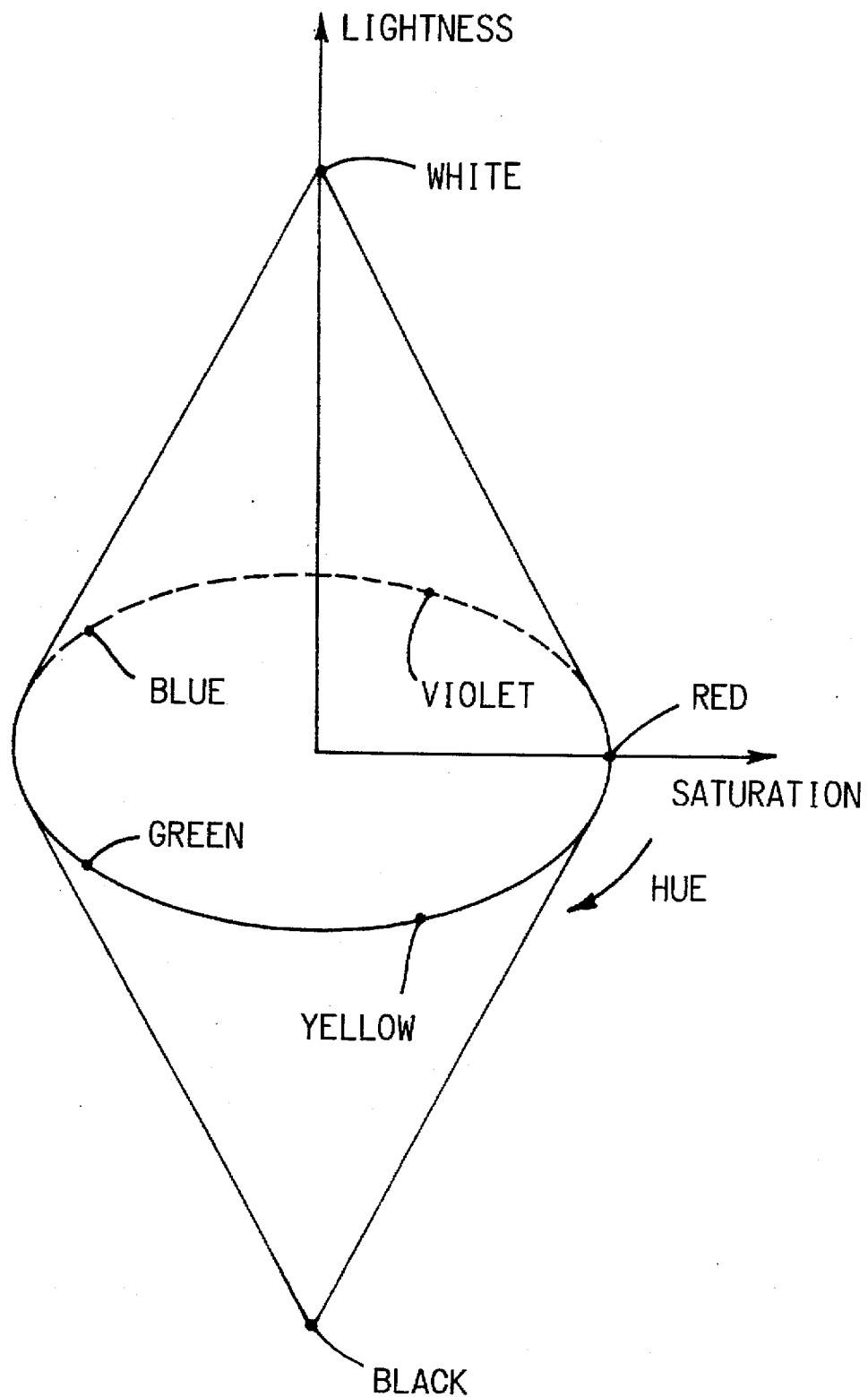
FIG. 2 illustrates parameters of colours.

Colour parameters will be first described with reference to FIG. 2. All colours are defined by three parameters: namely hue, lightness and saturation. A colour model defined by these parameters is in the form of a double cone as shown in FIG. 2. Achromatic colours from white to black are arrayed along the center axis of the cone, while saturated colours such as red, yellow, green, blue and violet are located around the central circumference, corresponding to a mid position on the lightness axis. The parameter of hue expresses tints, the parameter of lightness expresses the brilliance of the colour, and the saturation parameter expresses the vividness of the colour. When these three parameters are specified, the rendering unit 5 can determine colour information for an image feature (modelling data).

Figure 3:
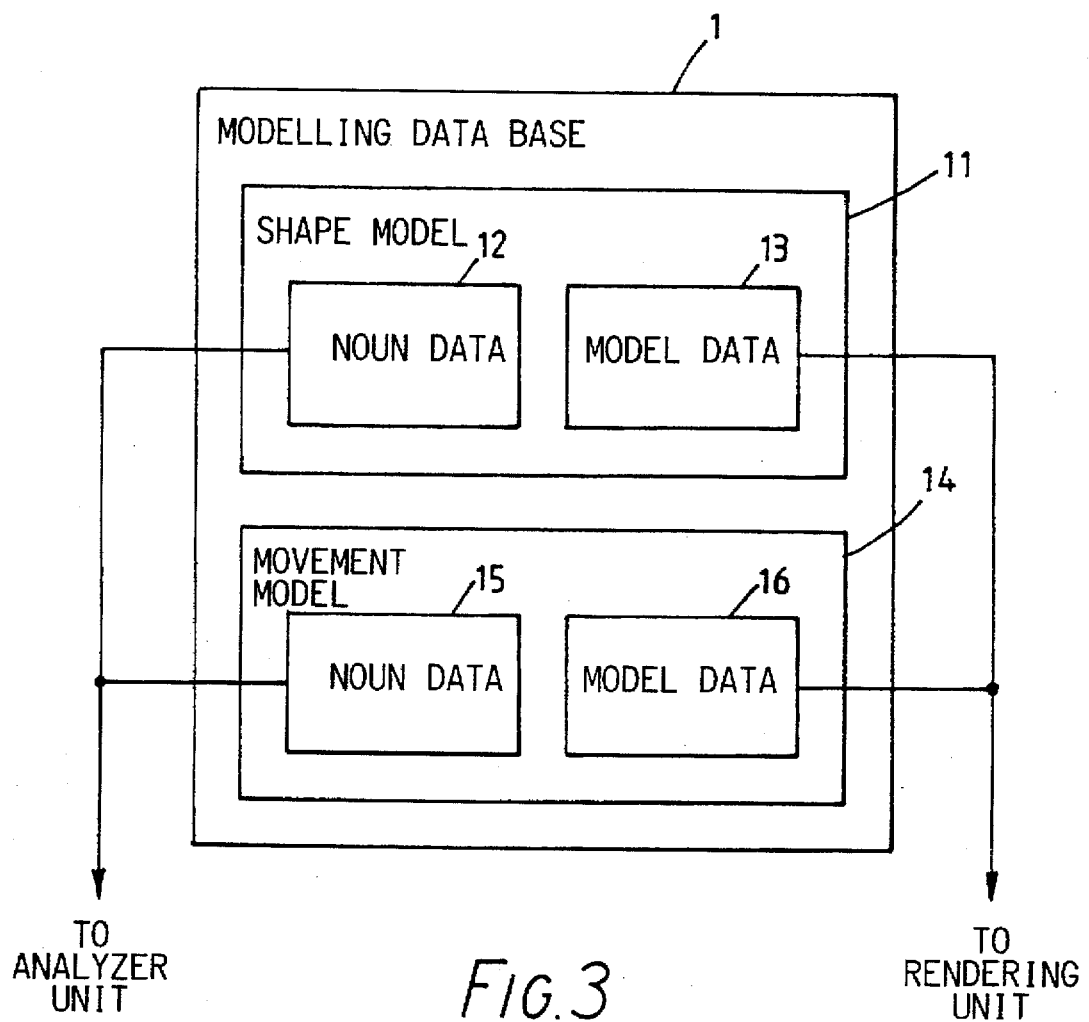
FIG. 3 illustrates details of a data base for modelling data.

The processing of the analyzer unit 3 will now be described by considering the details of the processing operations carried out by the individual units. The modelling data base 1 to which the analyzer unit 3 refers, contains information items (i.e. modelling data) which a user stores before the rendering operation, and the internal structure of the modelling data base is shown in FIG. 3. The data base 1 has image features in the form of shape models 11, and motion models 14, which are further constituted by noun data items 12, 15 and model data items 13, 16. Noun data expressing the semantic content of the corresponding model data items 13, 16 are stored as the noun data items 12, 15. The noun data may thus define "mountain" and "sea". On the other hand, the model data items 13, 16 are actually modelled data. For example, in a case where the shape models are expressed as the set of triangular data items, the vertex coordinate values etc. of triangles are stored.

Figure 4:
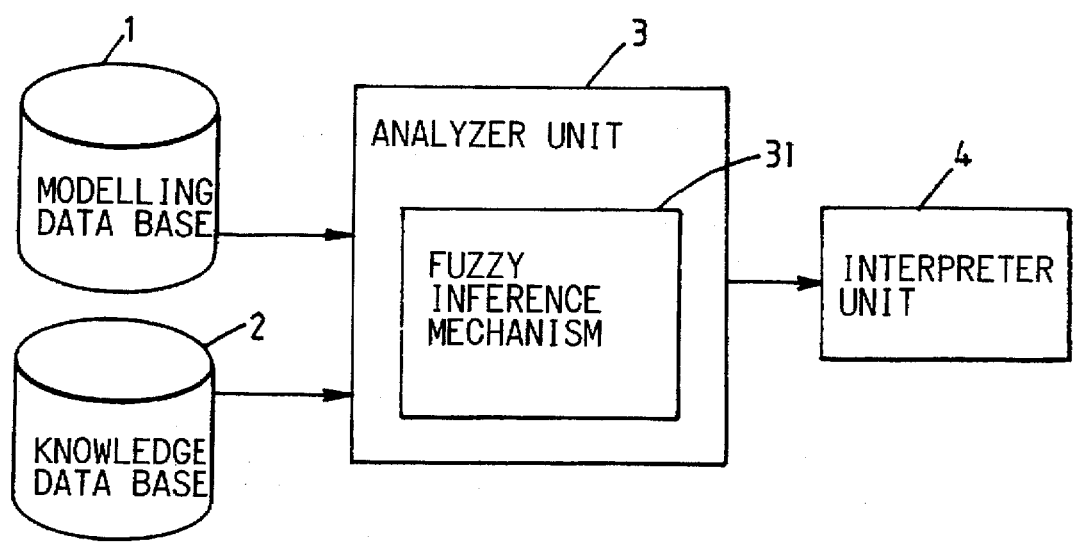
FIG. 4 illustrates details of the analyzer unit of FIG. 1.

Next, the structure of the analyzer unit 3 is shown in FIG. 4. The analyzer unit 3 includes a fuzzy inference mechanism 31. It converts the noun data 12 or 15 from the modelling data base 1, into a noun corresponding to a reference parameter by the use of a noun rule from the knowledge data base 2, and delivers the reference parameter to the interpreter unit 4.

Here, a fuzzy inference procedure 31 will be briefly described with reference to FIG. 5. Assume that, a first rule is defined as: "If $X_1$ is medial, then Y is enlarged". In this rule, the conditional clause beginning with "If" is defined as a 'fore-part' of the rule, while the conclusion clause beginning with "then" is defined as a 'rear-part'. Membership functions are defined for the respective parts. Each membership function indicates the distribution of probabilities, and a position at which the value of the membership function is "1" is the most probable. In an actual calculation, the area of the membership function of the rear-part is evaluated by a "min" operation on the basis of a membership value corresponding to an input value. The region of the area to be evaluated is the hatched one. The area of a hatched part is similarly evaluated as regards the second rule defined as: "If $X_2$ is small, then Y is made medial". Using the conclusions of the two rules, the two hatched parts are combined by a "max" operation so as to calculate the position of the center of gravity, which gives an output value.

Figure 6:
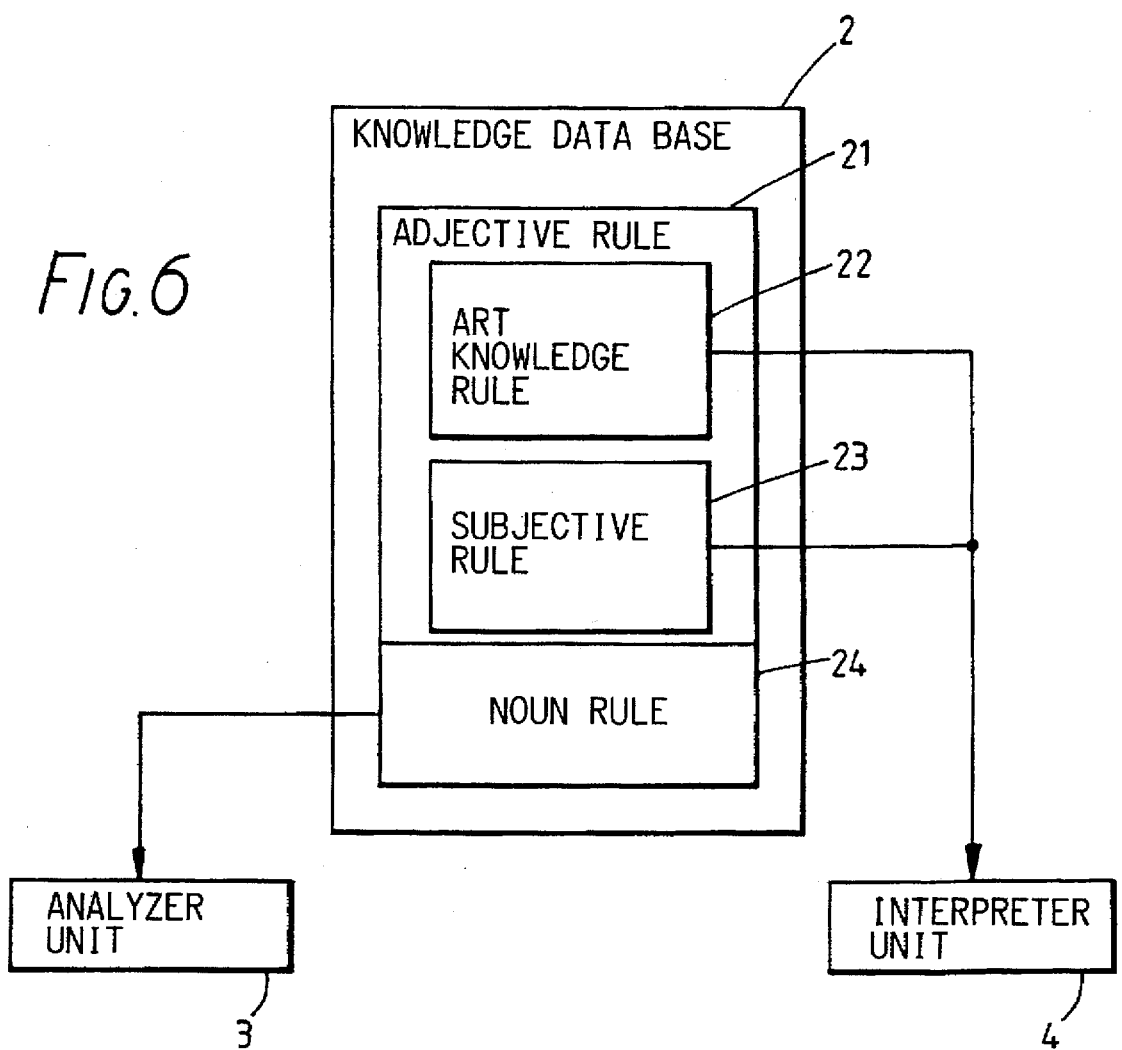
FIG. 6 illustrates in more detail the knowledge data base of FIG. 1.

The rules which are utilized for fuzzy inference in the analyzer unit 3, are derived from the knowledge data base 2. The structure of the knowledge data base 2 is shown in FIG. 6. Here, the data base 2 is divided into adjective rules 21 and noun rules 24. The noun rules 24 are used by the analyzer unit 3. The adjective rules 21 will be explained later, and practical examples of the noun rules 24 are shown in FIG. 7. By way of example, the noun rules may be:

(If the noun data="mountain", then the hue is set at green.)

(If the noun data="sea", then the hue is set at blue. )

Thus, "mountain is green" and "sea is blue" are nouns defined by the noun data and the noun rules. The membership functions are also defined. Here, only the rear-parts are illustrated assuming that the membership functions of the fore-parts are set at "1" at all times. In addition, the shape of each of the membership functions is set as illustrated in FIG. 7 so that the hue considered to be a reference may become the peak of the membership value. The analyzer unit 3 searches for the noun rule 24 conforming to the noun data 12, by means of a fuzzy inference mechanism 31, and it delivers the clause defining the conclusion of the logical statement (rear-part) and membership function thereof to the interpreter unit 4 as a reference parameter.

The processing of the interpreter unit 4 will be described below.

Figure 8:
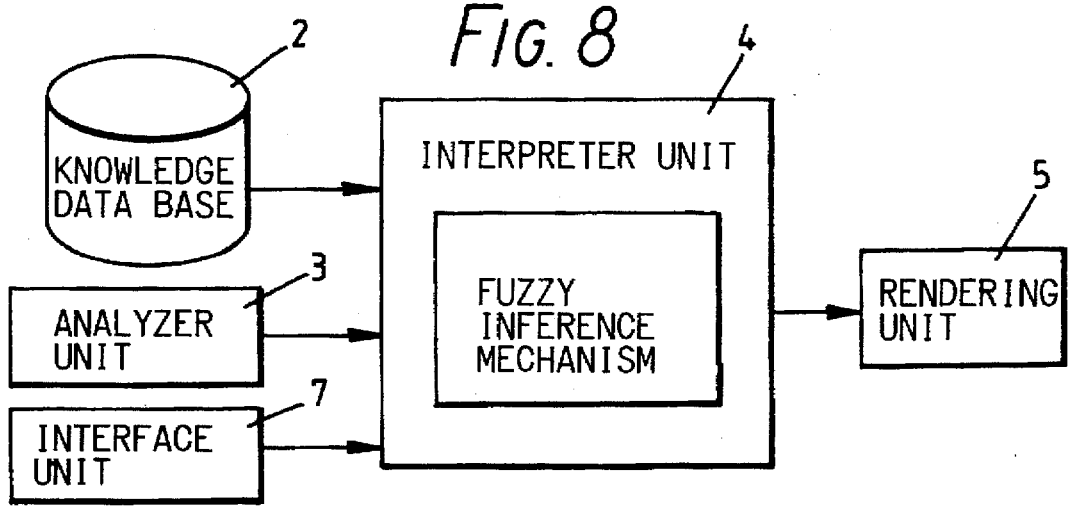
FIG. 8 shows details of the interpreter unit of FIG. 1.

The internal structure of the interpreter unit 4 is as shown in FIG. 8, and it includes a fuzzy inference mechanism 41 which is similar to that of the analyzer unit 3. The interpreter unit 4 receives the reference parameter representing the conclusion clause and membership function delivered from the analyzer unit 3, as a reference parameter so that the adjective rule 21 from the knowledge data base 2 is applied to the adjective data from the interface unit 7. It delivers the corrected parameter to the rendering unit 5.

The content of the knowledge data base in which the adjective rules are stored is as shown in FIG. 6. It should be noted that, in FIG. 6, the sub-division of the knowledge data base illustrated is a logical division and there need be no physical division of memories in which knowledge rules are stored. The adjective rules are subdivided into two types: art knowledge rules 22 and subjective rules 23. These two types of rules, and methods of constructing them, will now be described.

Figure 9:
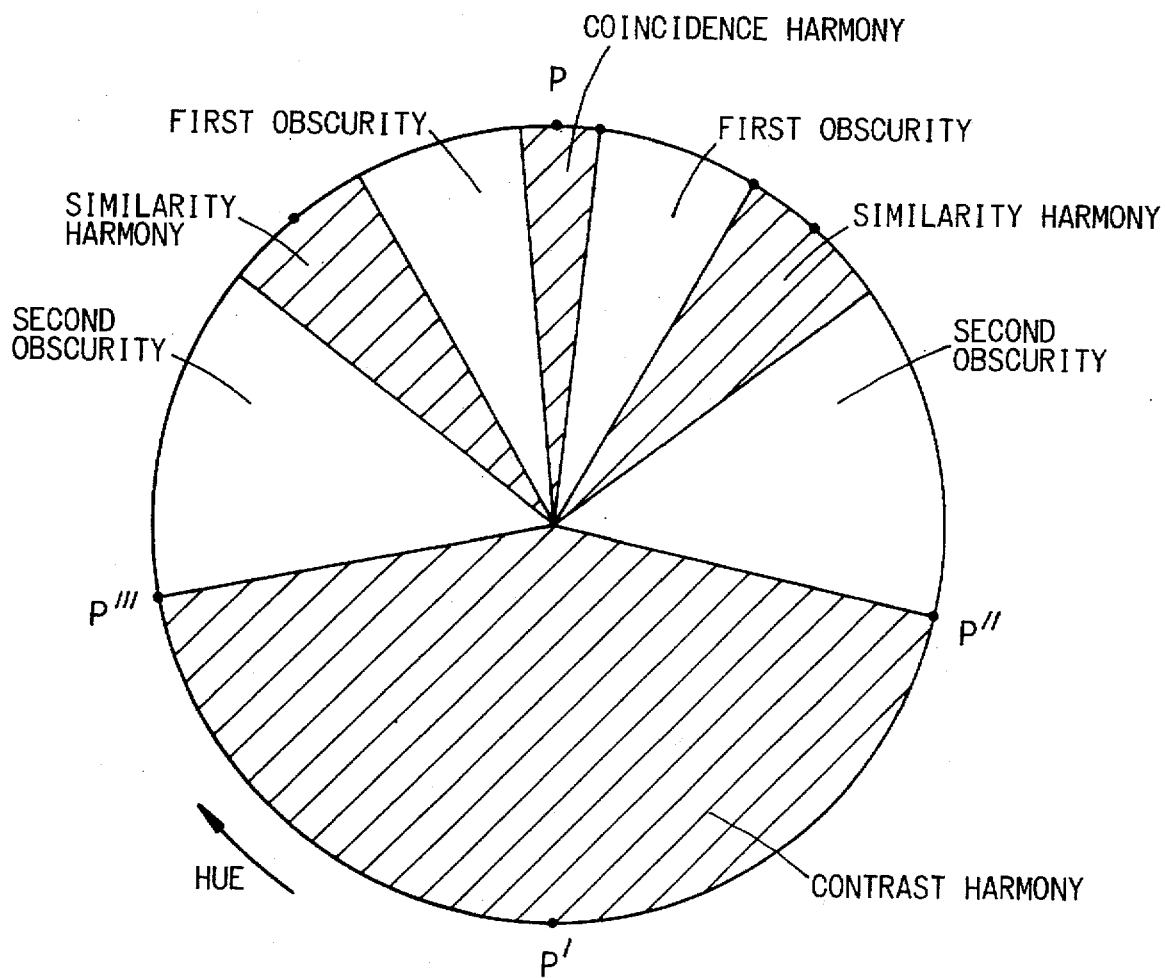
FIG. 9 shows an example of a rule defining art knowledge.

Art knowledge rules 22 are rules based on expertise which artists and designers utilize when producing images. In practice, they can be found e.g. in technical books, or by interviews with experts. An example of a rule derived from such expertise is shown in FIG. 9. It supplies instructions concerning colour schemes, and when a certain reference colour P is given, the permitted range of hue values for harmonizing colours is indicated. According to this art knowledge rule, regions defining harmonizing colours and regions defining clashing colours exist at ranges of angles symmetric with respect to the reference colour. The regions defining clashing colours are called the first and second obscurity regions, while the regions defining harmonic colours (hatched in FIG. 9) are called coincidence, similarity and contrast harmony regions. The names of the harmony regions signify that the reference colour and the colours of the corresponding parts are in the relationships of coincidence, similarity and contrast.

Figure 10:
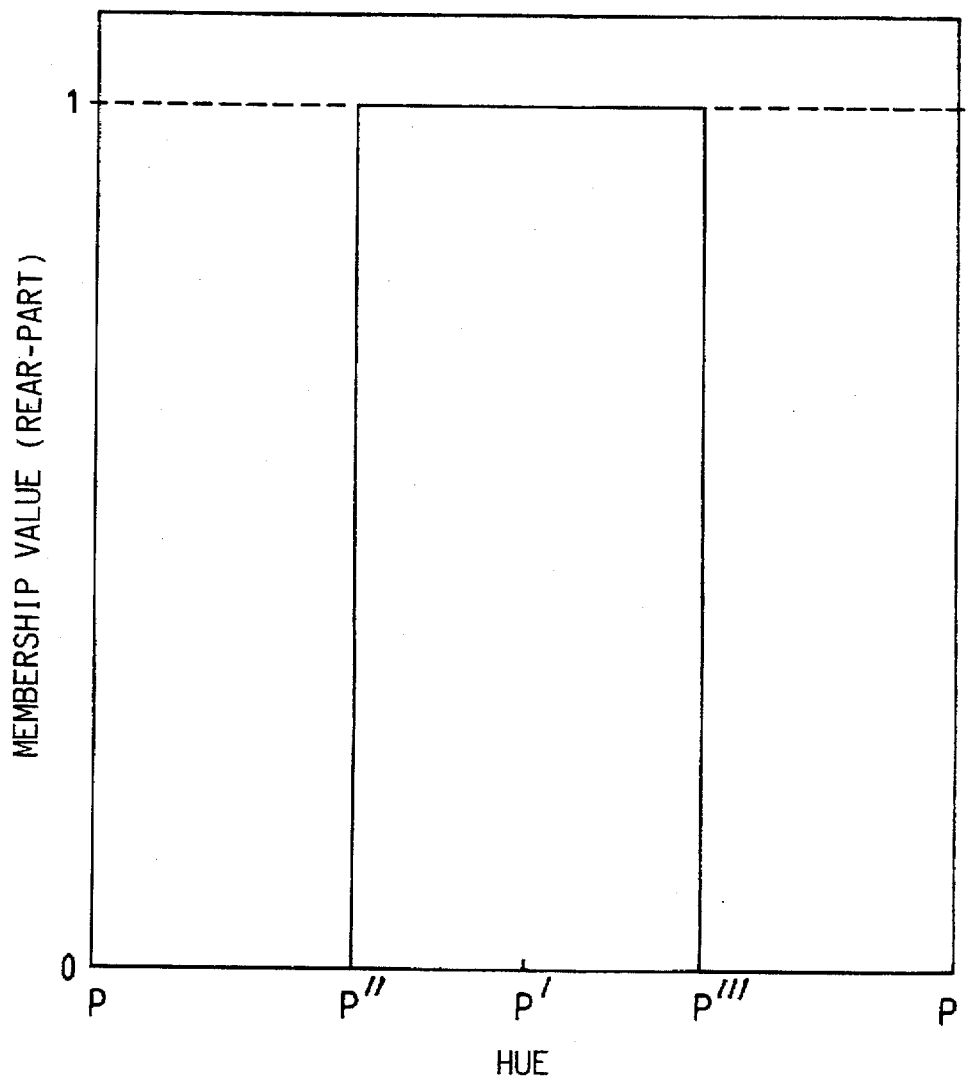
FIG. 10 illustrates the operation of that art knowledge rule.

The above art knowledge expressed in a rule form for fuzzy inference is shown in FIG. 10. The rule body is described as:

(If the adjective="contrastive" and the adjective="harmonious", then the hue is set at P'.) In addition, the membership function of the rear-part is determined so that, as illustrated in the figure by way of example, the membership value may be set to have a value of "1" in a section from hues P" to P'" in FIG. 9 and "0" in the other sections. The rule and the membership function described above is an example of an art knowledge rule 22; others will be immediately apparent.

The method of construction of the subjective rules 23 will now be discussed and examples will be thereafter mentioned. The user's intentions for rendering the image are expressed in terms of adjectives, and it is the major function of the subjective rules to convert the adjectives into parameters which the renderer can make use of.

Figure 11:
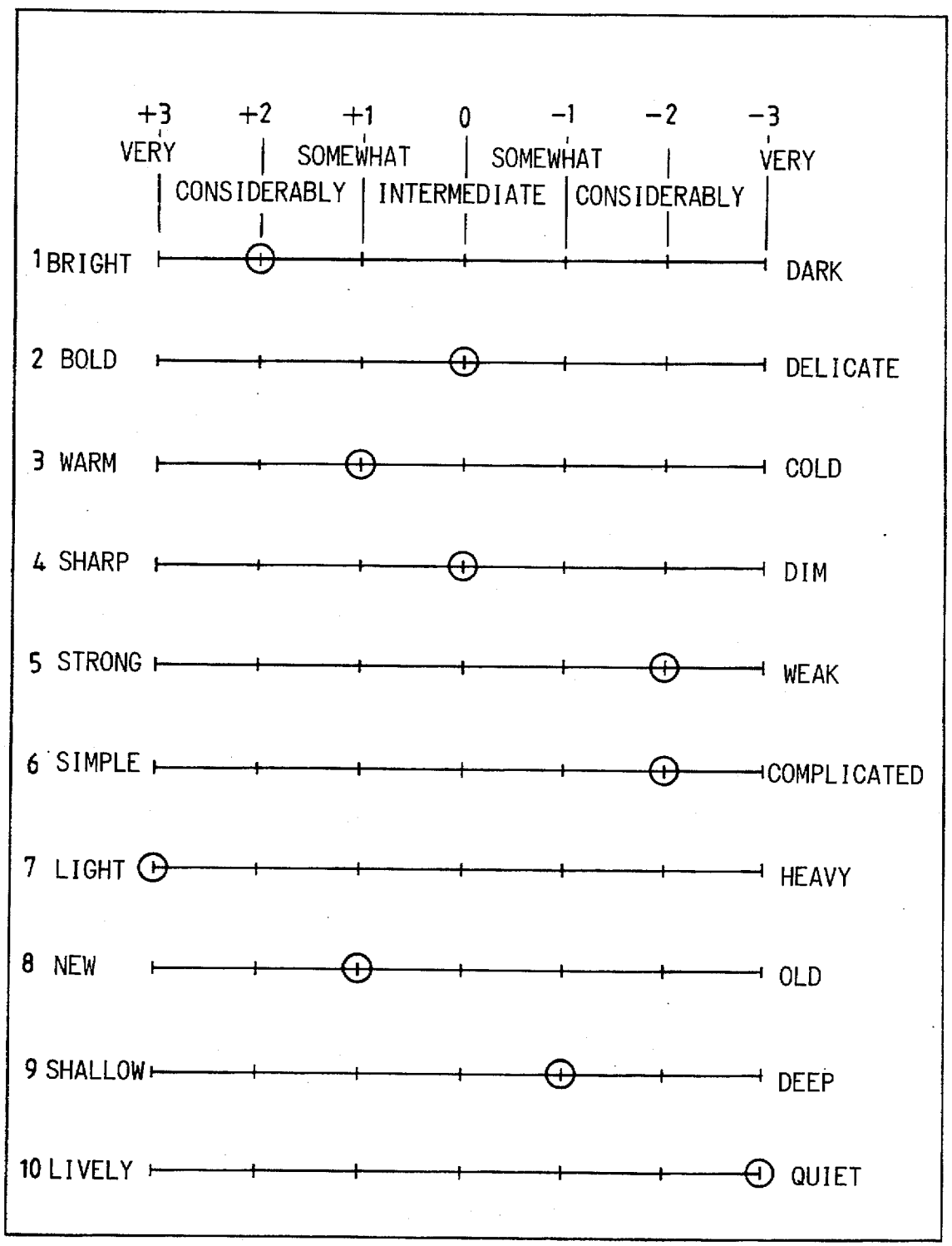
FIG. 11 shows examples of adjectives and their variation.

In constructing the subjective rules, it is required to present a sample to a plurality of subjects of an experiment, to ask them to evaluate the proportions to which adjectives relate to the sample, and to analyze the results of the evaluations. As a technique for the analysis, the use of the Semantic Differential (SD) method will be described as an example below. FIG. 11 shows a diagram illustrating one example of the evaluating method based on adjectives. First, the adjectives which are thought to have a great influence on the relevant parameter are selected, and they are combined with opposed adjectives, thereby to predetermine such adjective pairs as "bright—dark" which define a range of values. Subsequently, the sample is presented to the subjects, and these subjects are asked to mark that part of the range of each adjective pair which is thought to be the most suitable, to define a relationship between the sample and the adjective pair and so define a subjective characteristic of the noun. As indicated in FIG. 12, the range may, for example on this occasion consist of seven stages which extend from "intermediate" to "very" in both plus and minus directions and which are given values from +3 to −3. In order to investigate the relationships between the adjective pairs and the colour parameters, as listed in FIG. 12 by way of example, samples totalling twenty-seven sorts are presented to the subjects when it is assumed that each of the three parameters of the hue, lightness and saturation takes three sorts of values. The evaluations with the respective adjective pairs are carried out for all the samples.

The evaluated results of the adjective pairs are analyzed to extract common factors. FIG. 13 illustrates the factors which could be extracted, and the factor load amounts thereof. In this example, the three factors I, II and III have been extracted from the ten pairs of adjectives, and they are respectively construed as an impression of activity, an impression of expansion and an impression of complication. Thus, it is indicated that the principal measures of colours are composed of these three factors by way of example. The factor load amounts indicate the proportions in which the factors are loaded with the individual adjective pairs, and they are assumed to be related such that of $a_1>a_2> \ldots >a_{10}$, $b_1>b_2> \ldots >b_{10}$ and $c_1>c_2> \ldots >c_{10}$. In this example, the adjective pairs Nos. 5, 4, 2 and 10 are construed as being principally relevant to the factor representing the impression of activity, the adjective pairs Nos. 1, 8 and 3 to the factor representing the impression of expansion, and the adjective pairs Nos. 9, 6 and 7 to the factor representing the impression of complication. Further, an example of the result obtained by calculating the relationships between the colour parameters and the adjective pairs is tabulated in FIG. 14. Letters d, e and f denote the correlation coefficients of the adjective pairs to the hue, lightness and saturation, respectively, and these coefficients are assumed to have values such that $d_1>d_2> \ldots >d_{10}$, $e_1>e_2> \ldots >e_{10}$ and $f_1>f_2> \ldots >f_{10}$. The hatched parts in FIG. 14 represent parts which indicate high correlativities which exceed a predetermined threshold value. For example, the adjective pair "sharp—dim" is highly correlated to the hue.

Figure 15:
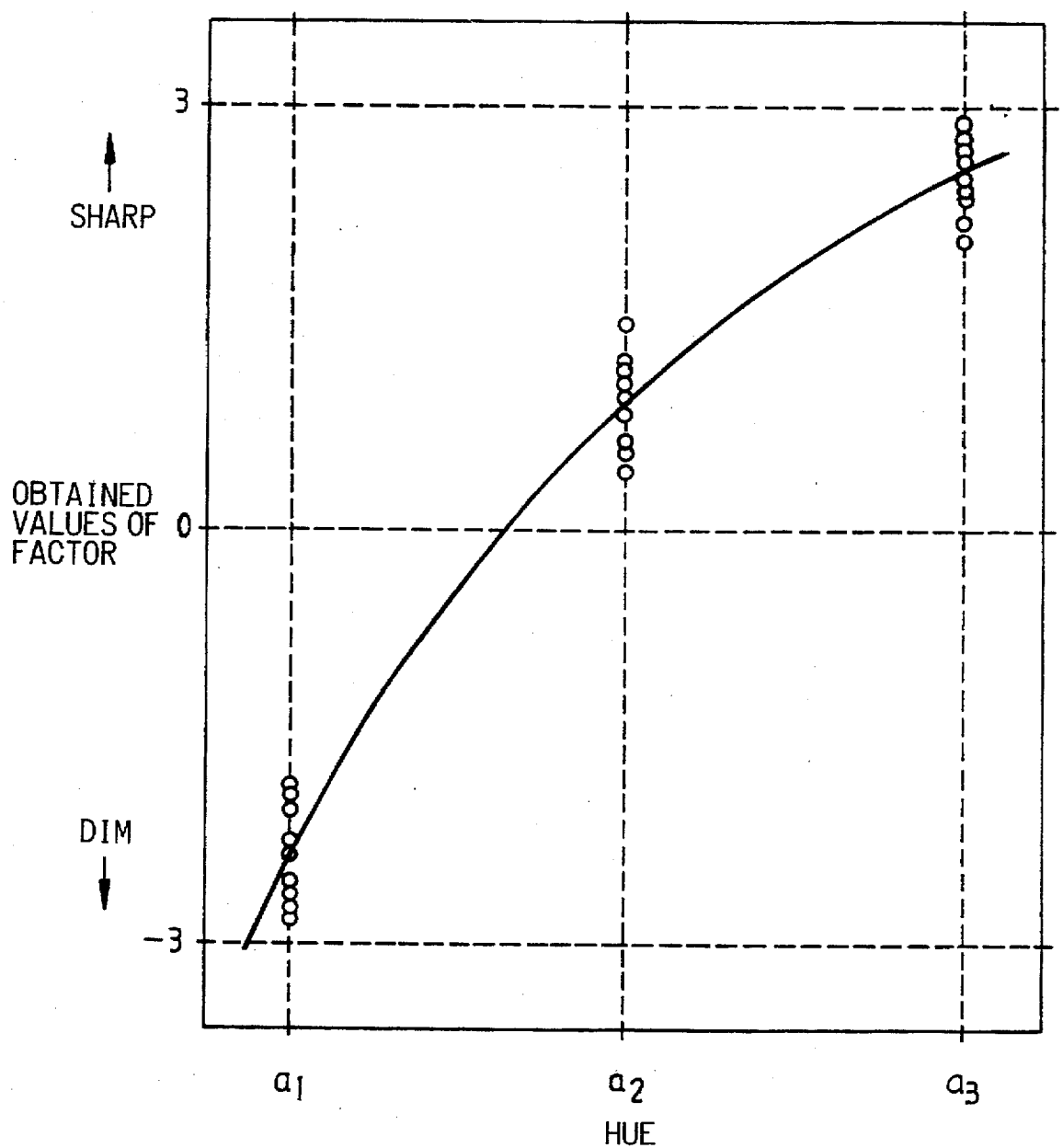
FIG. 15 illustrates relationships between parameters and adjectives.

FIG. 15 shows an example in which, for this adjective pair, the values of the factor obtained when the hue is changed are plotted. This example reveals that the hue may approach $\alpha_3$ in order to express a sharp colour and approach $\alpha_1$ in order to express a dim colour.

The contrast of the subjective rules of the knowledge data base are the equations of the relations between the adjectives and the parameter, e.g. as illustrated in FIG. 15. FIG. 16 shows the relationships of FIG. 15 converted into a rule form which can be utilized in fuzzy inference. For the purpose of the conversion, by way of example, the graph of the relations in FIG. 15 is divided into two parts by an axis where the value of the factor becomes zero, and the membership functions are generated. The rule bodies are described as, for example:

(If the adjective="sharp", then the hue is set at $\alpha_3$.)

(If the adjective="dim", then the hue is set at $\alpha_1$.)

Figure 17:
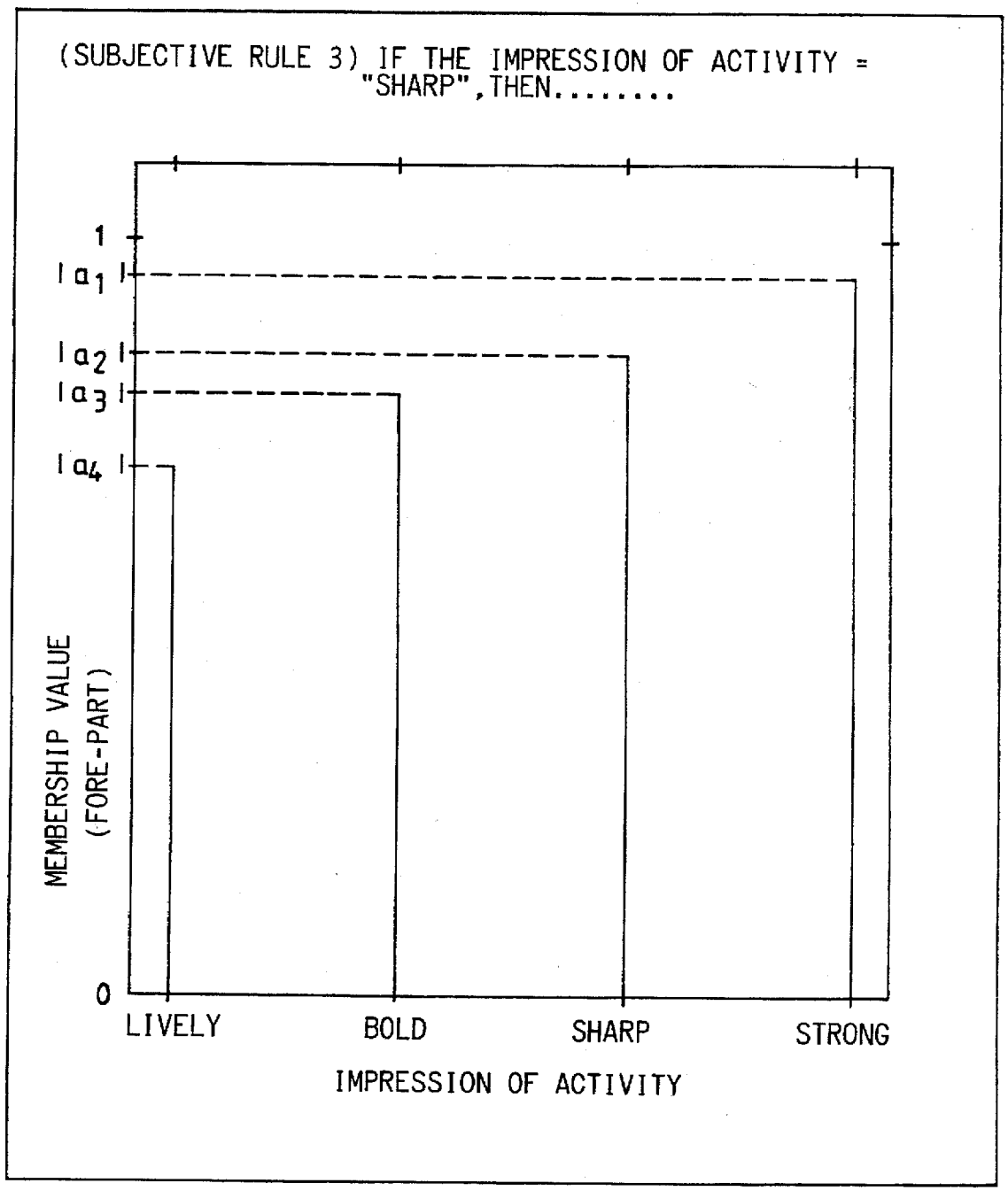
FIG. 17 shows how such subjective scale rules may be derived.

The membership functions of these parts is then derived, with the part which is above 0 in terms of the obtained values of the factor in FIG. 15 being allotted to the rule of "sharp", and the part which is below 0 being allotted to the rule of "dim". That is, the obtained values of the factor are normalized between 0 and 1, and the normalized values are set as membership values. On the other hand, the membership functions of the fore-parts can be found from the factor load amounts indicated in FIG. 13. In the example of FIG. 13, the adjectives "strong", "sharp", "bold" and "lively" load the common factor of the impression of activity heavily and exhibit factor load amounts $a_1$ to $a_4$, respectively. Since the membership functions of the fore-parts need to give the distributions of the probabilities of input magnitudes, the values $a_1$ to $a_4$ are set as membership values. The membership functions thus defined are shown in FIG. 17.

The art knowledge rules and the subjective rules can be constructed as described above. The interpreter unit 4 searches for the adjective rules i.e. both art knowledge rules and subjective rules which are applicable to the adjective data from the man-machine unit. Subsequently, the interpreter unit 4 determines the final corrected parameter by deriving a conclusion which may be considered as a modification to the reference parameter which is a conclusion drawn by the analyzer unit 3. Thus, this method of determination is such that, as illustrated in FIG. 5, the membership functions are combined by a "max" operation so as to calculate the position of the center of gravity, which is set as the corrected parameter.

The interface unit 7 may have an internal structure as shown in FIG. 18. It has an adjective input part 71, which accepts the adjective entered through a tablet or keyboard.

Figure 19:
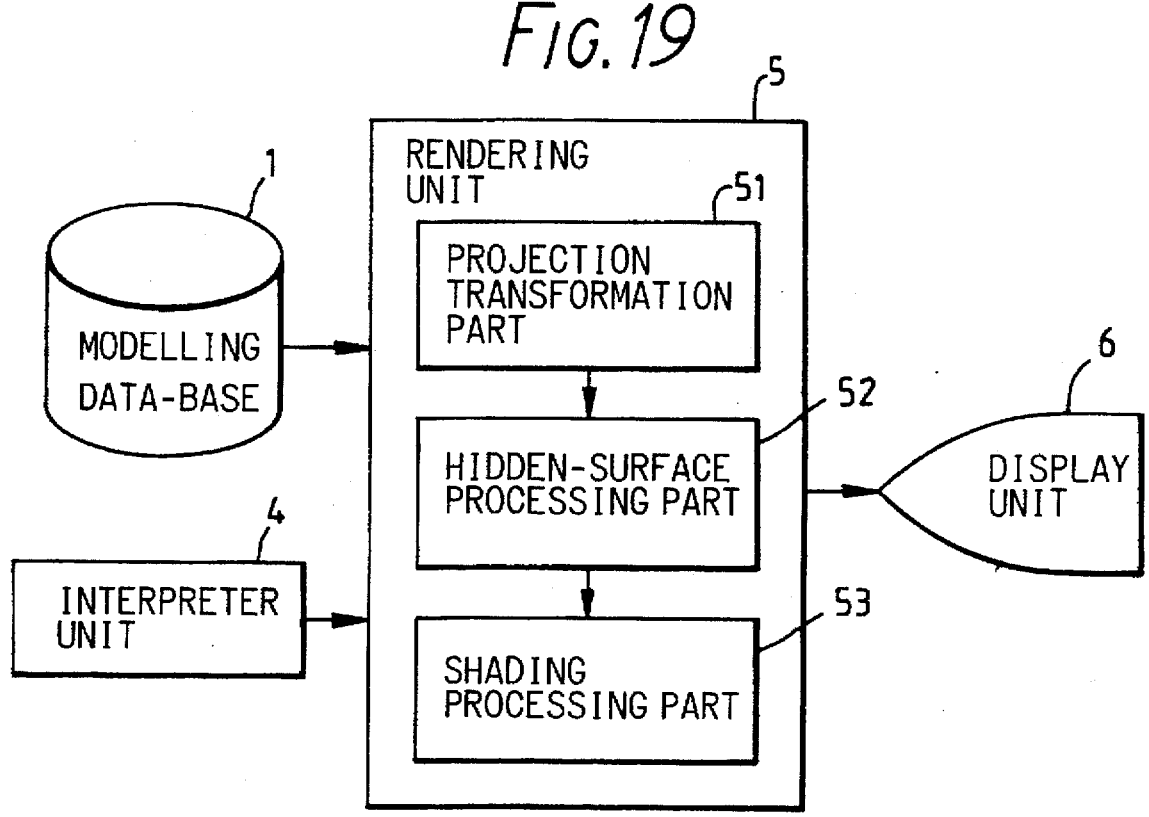
FIG. 19 shows in more detail a rendering unit for use in the arrangement of FIG. 1.

The internal structure of the rendering unit 5 is as shown in FIG. 19, and has a projection transformation part 51 which transforms the coordinates of a three-dimensional pattern into those of the two-dimensional screen, a hidden-surface processing part 52 which erases a hidden surface, and a shading processing part 53 which shades a model surface. The rendering unit 5 receives the model data 13 or 16 from the modelling data base 1 and the corrected parameter from the interpreter unit 4 as its inputs, subjects them to a rendering operation and delivers the result as output image information to the display unit 6.

Figure 20:
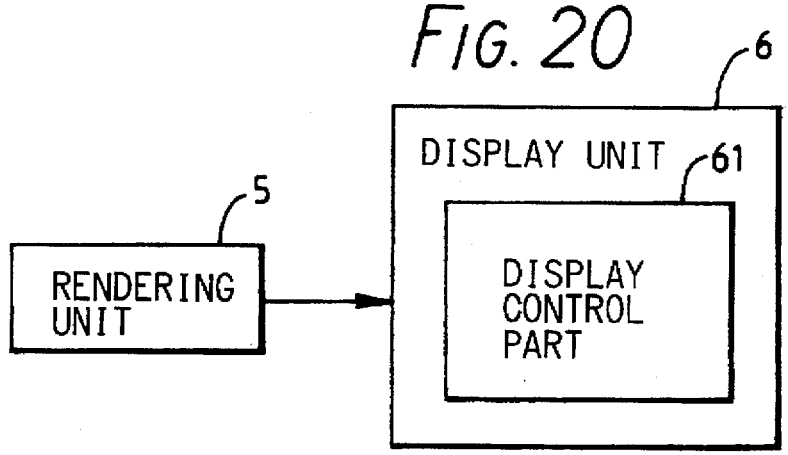
FIG. 20 illustrates in more detail a display unit for use in the embodiment of FIG. 1.

The internal structure of the display unit 6 is as shown in FIG. 20, and has a display control part 61 which converts the image information from the rendering unit 5 into an image, which is displayed.

Figure 21:
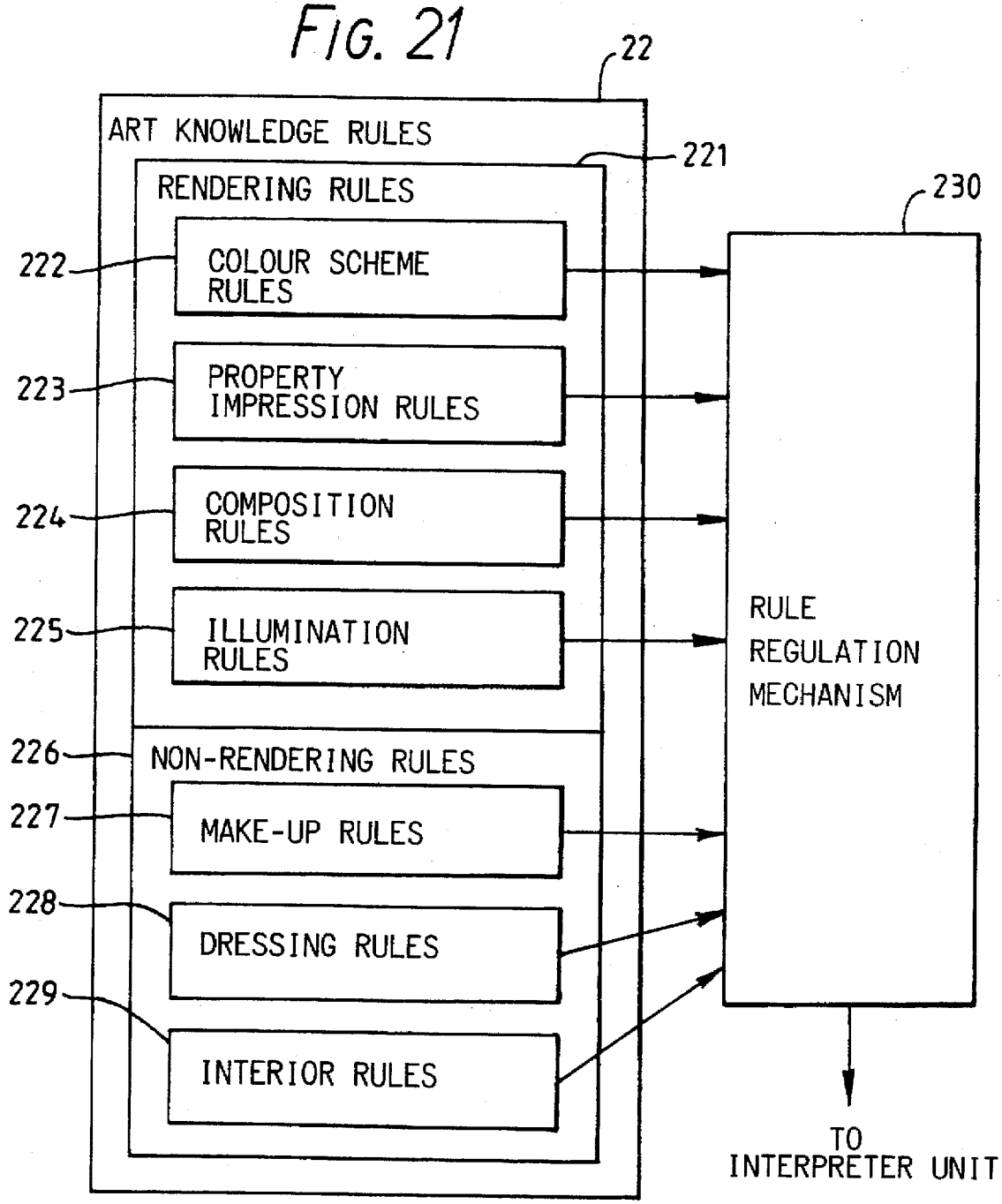
FIG. 21 illustrates a modification of the present invention in which there is further a rule regulating mechanism.

In the above embodiment, the art knowledge rules 22 shown in FIG. 6 can be divided as shown in FIG. 21, into rendering rules which are used by the rendering unit 5 and non-rendering rules 226 which are not directly relevant to the rendering unit 5. The rendering rules 221 can further be subdivided into colour scheme rules 222, property impression rules 223, composition rules 224 and illumination rules 225, while the non-rendering rules 226 can be subdivided into makeup rules 227, dressing rules 228 and interior rules 229. When the knowledge items are stored with the rules classified in respective fields in this matter, it is necessary to have a function capable of setting the degrees of importance of the rules in the fields. By way of example, this function may provide that great importance is attached only to the colour scheme rules. This may be achieved by a rule regulating mechanism 230 as shown in FIG. 22.

The function of the rule regulating mechanism 230 can be embodied by changing the levels of the membership functions as shown in FIG. 22. More specifically, for the rules of the fields which are not important, the levels of the membership functions of the fore-parts and rear-parts of the rules are forcedly lowered. In FIG. 22, parts shown by broken lines correspond to the membership functions before regulation. By lowering the levels of the functions, the contributive proportion of the pertinent rule diminishes in the calculation of the center of gravity for obtaining an output value, and the output value to be obtained changes in the direction in which the degree of influence of the pertinent rule is lower.

Thus, this arrangement can regulate the intensities of the degrees of importance of the rules in the respective fields and therefore brings forth the effect that the intention of the image rendering can be instructed more elaborately.

In the arrangement described above, it is also possible to add a direct input part 72 to the interface unit 7 as shown in FIG. 23. The direct input part 72 does not enter physical parameters such as the hue, but it uses the data used for the construction of the subject rules 23. The outlines of the interface unit 7 and the interpreter unit 4 therefor are shown in FIG. 24. Since there are three subjective factors for determining one colour as shown in FIG. 13, the interface unit 7 is provided with three input axes corresponding to the impressions of activity, of expansion and of complication.

Those of the adjective pairs which have large factor load amounts are assigned to the respective input axes, and the three pairs of "sharp—dim", "bright—dark" and "simple—complicated" are respectively employed. Then, in the light of FIG. 14, the adjective pair "sharp—dim" is highly correlated with the hue, the adjective pair "bright—dark" with the hue and the saturation, and the adjective pair "simple—complicated" with the lightness and the saturation. Consequently, the input axes are respectively coupled with the parameter control portions 42, 43 and 44 of the interpreter unit 4 for only the highly correlative parameters. Subsequently, the interpreter unit 4 converts the direct input values into parameters and delivers the parameters to the rendering unit 5. The relationships between the adjective pairs and the parameters which are illustrated in FIG. 15 are used for this conversion.

Thus, the arrangement permits the user to enter direct input values and therefore has the effect that the intention of the image rendering can be instructed in more detail.

When constructing the subjective rules 23, illustrated in FIGS. 13 and 14, the evaluated results are analyzed in dependence on the factors, and the common factors are extracted, whereupon the correspondences of the common factors with the parameters are found so as to determine the membership functions. However, the membership functions can also be determined directly from the results obtained when the evaluations illustrated in FIG. 11 are carried out on the basis of the factors shown in FIG. 12. The three factor axes need not be extracted, as described above, but the ten adjective pairs used in the evaluations may be used directly. Thus, the average of the estimated values are calculated, whereby a result similar to the relationships between the adjectives and the parameter shown in FIG. 15 can be obtained. Thus even with this method, the subjective rules 23 shown in FIG. 16 can be determined.

The arrangement discussed above has the effect that the estimated result can be directly reflected.

In the present invention the adjectives from which the subjective characteristics are obtained are not limited to those described. There is no particular restriction on the adjectives which may be used, but adjectives can be entered as the user wishes. It is also possible, however, to restrict the use only to adjectives which are highly correlative with parameters as the results of a previous factor analysis. To this end, the usable adjective pairs may be clearly indicated on a display, such as that shown in FIG. 25, thereby permitting the user to select any of them.

The arrangements discussed above make it possible to select only the adjectives highly correlated to the parameters, and therefore there is an increase in accuracy when turning a subjective intention into a parameter.

With this aspect of the present invention, the user can instruct the image rendering of a rendering operation in terms of adjectives and the intention of the user may therefore reflect more easily than when dealing directly with physical parameters. The rendering of the desired image can accordingly be simplified, so that the man-hours needed for the rendering operation can be reduced.

So far, the present specification has discussed the generation of images using subjective characteristics. However, the present invention also proposes that one characteristic of an image be assigned to image features on the basis of another characteristic of those image features, that other characteristic defining a sequence among those image features. This aspect will now be discussed in detail, referring to additional embodiments of the invention, and will be discussed in terms of the assignment of colour characteristics on the basis of the respective areas of the image features. Of course, as before, the present invention is not limited to the assignment of colours.

Embodiments incorporating this aspect of the present invention will now be described, in terms of an apparatus which acts as an aid to colour-arrangement determination.

FIG. 25 is a block diagram of a colour-arrangement determination aid apparatus according to a further embodiment of the present invention. With the colour-arrangement determination aid apparatus, a user generates a model to be rendered, a three-dimensional model 82 in this embodiment, by means of a CAD system 81. Subsequently, the hidden surface of the model 82 is processed, that is, parts of the model which are not visible are erased by a hidden-surface processing unit 83. Then, the user prepares a reference picture 84 bearing colours in which the model is to be painted, and the user loads the reference picture 84 into the apparatus by means of a colour scanner 85. The arranged colours of the loaded reference picture 84 are extracted by an arranged-colour extraction unit 86. Then a colour-arrangement determination unit 87, allots the colours extracted by the arranged-colour extraction unit 86 to the regions to-be-coloured of the model subjected to the hidden-surface processing by the hidden-surface processing unit 87. Next, the coloured model is shaded by a shading processing unit 88, and the resultant model is rendered to be displayed on a display 89.

Figure 27B:
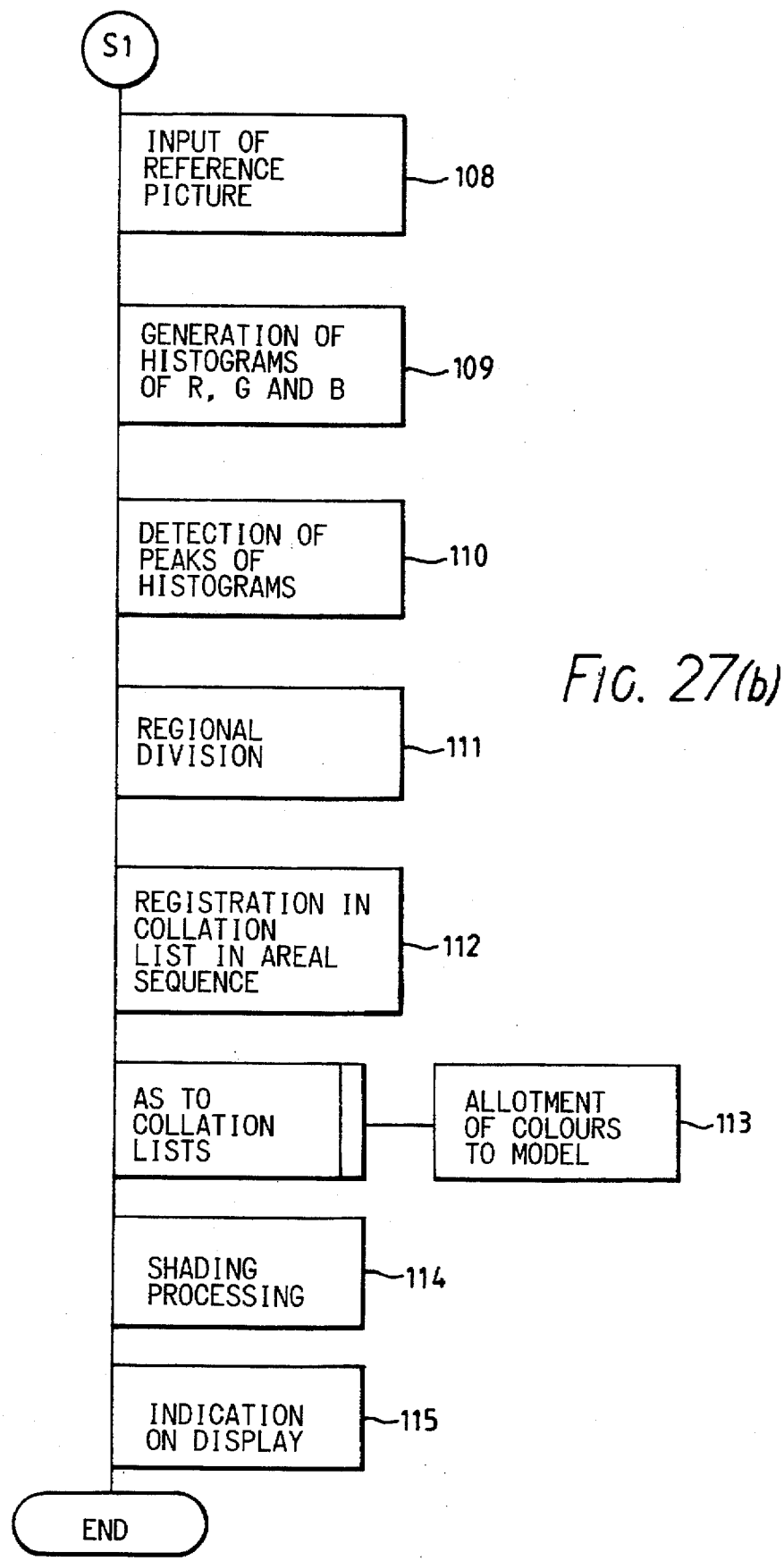

FIG. 27 is a flow chart showing the detailed steps of the processing operations of the colour-arrangement determination aid apparatus described above.

First, the CAD system 1 performs processing at steps 101 and 102. At step 101, the user enters the model to-be-rendered in terms of basic data known as geometrical primitives and defines shapes. For example, a model such as that shown in FIG. 28 may be defined in terms of numerical values of height, width and depth, for a rectangular parallelepiped, and values of height and radius for each of a circular cylinder and a circular cone. On this occasion, an identifier M1 is associated with the rectangular parallelepiped, an identifier M2 with the circular cylinder, an identifier M3 with the circular cone, and an identifier M4 with the background.

The geometrical primitires entered as the inputs are then transformed at step 102, into triangular plate elements. That is, all the fundamental patterns are approximated as a set of triangular plates, and also curved surfaces are approximated by flat plates. Subsequently, the set of the triangular plate elements are registered as a three-dimensional model 2. The actual data consists of the apical coordinate values, apical normal vector component values and fundamental-pattern identifiers of the respective triangular plate elements.

The hidden-surface processing unit 3 then carries out the processing of steps 103 to 105. Step 103 corresponds to projection transformation processing by which the triangular plate element constituting the three-dimensional model is projected on a two-dimensional screen. As is generally known, this processing can be carried out so that the apical coordinate of each triangular plate element is multiplied by a projection transformation matrix.

At step 104, the hidden-surface processing erases parts not seen for every pixel within the projected triangular plate. For example, according to a conventional Z buffer algorithm, processing can be carried out so that depth information with respect to the visual point is stored in a pixel unit and that the depth information is updated when the current depth value is on that side of the stored value corresponding to the viewer.

Thus a model of the parts closest to the viewer is generated for each pixel, i.e. a series of image features are assembled, which image features are to be coloured as will now be described. On this occasion, the fundamental-pattern identifier of the relevant pixel is registered at a step 105. This identifier is information for identifying to which of the fundamental patterns the model displayed on the screen belongs. As shown in FIG. 29, the fundamental patterns displayed in the respective pixels can be identified by this processing. It is indicated in the figure that regions Q1, Q2, Q3 and Q4 display the fundamental patterns M1, M2, M3 and M4, respectively. That is, each pixel is managed and stored within a computer in the form in which the identifier information is added to the ordinary red (R), green (G) and blue (B) luminance information items.

Next, the operation of the arranged-colour extraction unit 86 will be described. The user selects the image of a colour arrangement as the reference picture 84 (e.g. that of FIG. 30) which is input to the colour scanner 85. That is, the user instructs the arranged colours of a picture in the computer graphics system by entering a photograph, an illustration or the like which already exist (step 108). In the flow chart of FIG. 27, steps 108 to 111 are the processing contents of the arranged-colour extraction unit 86.

At step 109, the three histograms of R, G and B are generated on the basis of the RGB information items of the reference picture 84 received from the colour scanner 85. By way of example, the frequences of the R, G and B luminances are calculated and stored as shown in FIG. 31.

At step 110, peak parts are detected from within the generated histograms. By way of example, four peaks P1, P2, P3 and P4 can be detected in the histograms shown in FIG. 31 by investigating the maximum values.

At step 111, the region to-be-coloured is divided into parts, which parts are to be coloured on the basis of the detected peaks. By way of example, in the case where the histograms depicted in FIG. 31 have been derived from the reference picture depicted in FIG. 30, the region is divided by evaluating sections in which the respective peaks are contained. In FIG. 31, a section from $r_1$ to $r_2$ is found for the peak $P_1$. Similarly, sections from $g_1$ to $g_2$, from $b_1$ to $b_2$, and from $b_2$ to $b_3$ are respectively found for the peaks P2, P3 and P4. When these sections are respectively set as individual regions, the region to be painted can be divided into four regions R1, R2, R3 and R4 as shown in FIG. 32. Here, the region R1 corresponds to the peak P1. Likewise, the region R2 corresponds to the peak P2, the region R3 to the peak P3, and the region R4 to the peak P4. The peak values can then be used for the colours representing the respective regions.

Next, the processing of the colour-arrangement determination unit 87 will be explained, represented by steps 106 and 107 and steps 112 and 113 in the flow chart of FIG. 27.

At step 106, the information items of the identifiers of the fundamental patterns obtained as illustrated in FIG. 29 are counted for all the pixels, thereby to calculate the number of the pixels contained in the individual identifiers. Since the areas of the respective identifiers are evaluated in this way, the areas of the regions Q1, Q2, Q3 and Q4 in FIG. 29 are thus known.

At step 107, the regions are ordered in a collation list in accordance with the sizes of the areas. The collation list has the structure as shown in FIG. 33, and the regions are registered in the fundamental-pattern collation list 91 at this step. In the case of FIG. 29, for example, the regions are registered in the areal sequence Q4, Q1, Q2 and Q3. Thus, the image features are ordered in terms of one characteristic.

At step 112, the results of the regional division of the reference picture 84 found as illustrated in FIG. 32 are registered in a collation list in areal sequence in the same way as at the steps 106 and 107. They are registered in the reference picture collation list 90 in FIG. 33. For the analysis of the reference-picture shown in FIG. 32 the results are registered in the sequence of R3, R2, R4 and R1.

At step 113 the colours to-be-arranged are allotted to the image features of model in the areal sequence of the collation lists. To this end, the regions are collated in the areal sequence by the use of the reference-picture collation list 10 and the fundamental-pattern collation list 11. In consequent, the regions R3, R2, R4 and R1 are respectively collated with the regions Q4, Q1, Q2 and Q3 as illustrated in FIG. 33. Thus, the colour information items are determined for the respective geometrical primitives (image features) and the colour arrangement within the screen is also determined. That is, in this embodiment, the colour of mountains (R2) is allotted to the rectangular parallelepiped M1 (Q1) in FIG. 28, the colour of the sky (R4) to the circular cylinder M2 (Q2), the colour of clouds (R1) to the circular cone. M3 (Q3), and the colour of the sea (R3) to the background M4 (Q4).

Subsequently, in order to shade the fundamental patterns, shading processing at a step 114 is carried out in the shading processing unit 88. The shading processing shades the planes of the fundamental patterns in dependence on the angles defined between them and a light source.

Finally, at step 115, the fundamental patterns to which the instructed colours are allotted and which are shaded are displayed on the display 89 by suitable display rendering.

In the above arrangement, the reference picture needs to be input for instructing the colours to-be-arranged on each occasion. It is also possible, however, additionally to provide a reference-picture data base 95 as in the modification shown in FIG. 34. In the arrangement shown in FIG. 34, the method of entering reference pictures 84 is the same as in the arrangement of FIG. 26, using a scanner 85, but data relating to those pictures are stored in a reference-picture data base 95 by a reference-picture registration unit 93. Thereafter, when operating the apparatus, a selected reference picture may be retrieved from the data base 95 by a reference-picture retrieval unit 94. The subsequent processing of the retrieved data and the application of that data to the colouring of image features of a model may be the same as that of the arrangement of FIG. 26. This arrangement has the advantage that the same reference picture can be used repeatedly.

Furthermore, or as an alternative, an arranged-colour data base 98 can be additionally provided as shown in FIG. 35. This data base 98 stores the reference-picture collation list 90 of FIG. 33. Colours to be arranged are registered by an arranged-colour registration unit 96, and necessary colours to be used are retrieved by an arranged-colour retrieval unit 97. Thus, the arrangement of FIG. 35 is similar to that of FIG. 34, but with the recordal of the colours in the data base being after they have been arranged in sequence, rather than before. The arrangement of FIG. 35 has the advantage that, since the data items are stored when the extraction of the colours to-be-arranged has ended, the arranged-colour extraction processing is dispensed with, so the processing speed can be increased.

With this aspect of the invention, a user can instruct colours to-be-arranged in computer graphics by supplying a reference-picture, so that the method of instruction is easy, and the conversation between a computer and the user can be achieved. Moreover, owing to the easy instructions, the number of times of trials by the user decreases, and the number of man-hours for the colour arranging operation decreases. Further, by selecting a reference of excellent colour arrangement for the reference picture, that colour arrangement may be reflected in a picture generated by computer graphics, so that the quality of the picture which can be generated is enhanced.

Furthermore, the aspect of the invention described with reference to FIGS. 26 to 35 may be used in conjunction with that of FIGS. 1 to 25, by using the reference picture to derive, for the modelling data, the subjective characteristic associated with each image feature. Thus, the colour if the 'sky' in an image would be defined to correspond to the colour of the sky in a reference picture, with the user then being able to vary the colour on the basis of subjective characteristics. This may be useful if it is desired to create an image in which the image features correspond in e.g. size or shape to image features of a reference image, but with the colours then being varied subjectively. In such an arrangement, the arranged-colour extraction unit 86 in FIG. 84 supplies a noun rule to the analyzer unit in FIG. 1, which is then applied to noun data from the modelling data base in FIG. 1 in the same way as to the data from the hidden surface processing unit 83 in FIG. 26.

What is claimed is:

1. A method of generating an image to be displayed, comprising the steps of:
   a) storing modelling data of said image to be displayed, said modelling data including a plurality of image features for said image;
   b) storing a plurality of noun data, each noun data semantically defining one of said image features of said modelling data;
   c) storing a plurality of first characteristics of said image features, each of said first characteristics being associated with one of said image features such that there is an objective relationship predetermined as a standard value between said one image feature and said associated first characteristic;
   d) defining at least one subjective property for each of said first characteristics, said subjective property being information of a user's intention relating to an image feature associated with said first characteristic, said subjective property defining a subjective characteristic of an image feature and being represented by a value which varies over a range;
   e) selecting at least one of said image features by selecting one of said plurality of said noun data;
   f) selecting a value for said subjective property, thereby selecting a second characteristic;
   g) modifying at least one first characteristic associated with said selected at least one image feature based on said second characteristic, to generate a modified characteristic associated with said selected at least one image feature; and
   h) rendering an image on the basis of said selected at least one image feature, and said modified characteristic.

2. A method according to claim 1, wherein said objective relationship between each said one image feature and said associated first characteristic defines a predetermined distribution function of said associated first characteristic for each of said image features.

3. A method according to claim 1, further comprising the step of defining at least one rule for determining a most appropriate first characteristic with respect to said selected at least one image feature, and modifying said at least one first characteristic corresponding to said selected at least one image feature on the basis of said at least one rule.

4. A method according to claim 1 further comprising the step of rendering a preliminary image for visualizing the relationship between said selected at least one image feature and said at least one first characteristic on the basis of said selected one corresponding first characteristic between said steps (d) and (e).

5. A method according to claim 1, wherein said first characteristics are colours.

6. A method according to claim 1, wherein said step (f) is carried out on the basis of fuzzy inference processing.

7. A method according to claim 1, further comprising the steps of:
   storing a plurality of image features;
   deriving at least one first image data characteristic for each of said image features, said first image data characteristics of said plurality of image features are ordered in a first sequence;
   assigning one of a plurality of second image data characteristics to each of said image features on the basis of the relative location of said first image data characteristic, corresponding to said each image feature, in said first sequence; and
   rendering each of said image features on the basis of said assigned second image data characteristic, thereby rendering an image;
   said second image data characteristics being said first characteristics of said image features and each objective relationship being defined on the basis of the relative location of a first image data characteristic corresponding to an image feature in said first sequence.

8. A method of generating an image to be displayed, comprising the steps of:
   storing a plurality of image features and a plurality of first image data characteristics, each of said first image data characteristics being associated with one of said image features such that there is an objective relationship predetermined as a standard value between said one image feature and said associated first image data characteristic;
   defining at least one subjective property for each of said first image data characteristics, said subjective property defines a subjective characteristic of an image feature;
   assigning one of a plurality of second image data characteristics to each of said image features on the basis of a value selected for said subjective property defined for each of said first image data characteristics; and
   rendering each of said image features on the basis of said assigned second image data characteristic, thereby rendering an image.

9. A method according to claim 8 wherein said at least one first image data characteristic is defined by the area of each of said image features.

10. A method according to claim 8 wherein said plurality of second image data characteristics are colours.

11. A method according to claim 8, wherein said plurality of second image data characteristics are derived by scanning a preselected reference image.

12. A method according to claim 11, wherein said preselected reference image has a plurality of reference image features, and said second image data characteristics are derived from corresponding reference image data characteristics of said reference image features.

13. A method according to claim 12, wherein said reference image features each have first and second reference image data characteristics, said first reference image data characteristics of said reference image features are ordered in a reference sequence, and said second image data characteristic of each of said image features is determined to correspond to said second reference image data characteristics of the reference image feature which has a location in said reference sequence which corresponds to the location of a respective one of said image features in said sequence.

14. An apparatus for displaying an image, comprising:
   a) memory means for storing:
      (i) modelling data of said image, said modelling data including a plurality of image features for said image,
      (ii) a plurality of noun data, each noun data semantically defining one of the plurality of the image features of said modelling data, and
      (iii) a plurality of first characteristics of said image features, each of said first characteristics being associated with said image features such that there is an objective relationship predetermined as standard value between each image feature and at least one corresponding first characteristic;
   b) rule base means for defining at least one subjective property of said first characteristics, said subjective property being information of a user's intention relating to an image feature associated with said first characteristic, said subjective property defining a subjective characteristic of an image feature and being represented by a value which varies over a range indicating the intensity of the intention by said user;
   c) user operable means having:
      (i) means for selecting at least one of said image features by selecting one of said plurality of noun data, and
      (ii) means for selecting a value for said subjective property thereby selecting a second characteristic;
   d) processing means for modifying at least one first characteristic associated with said selected at least one image feature based on said second characteristic, to generate a modified characteristic associated with said selected at least one image feature;
   e) rendering means for generating a rendered image on the basis of said selected at least one image features, and said modified characteristic; and
   f) display means for displaying the rendered image.

15. An apparatus according to claim 14, wherein said memory means is arranged to store information relating to said at least one subjective property.

16. An apparatus according to claim 14, wherein said processing means comprises an analyser for analysing said objective relationship between each said image feature and at least one corresponding first characteristic, and an interpreter for controlling said relationship on the basis of said second characteristic, thereby to modify said at least one first characteristic.

17. An apparatus according to claim 14, further including scanning means for scanning a physical image, thereby to derive at least some of said plurality of first characteristics.

18. An apparatus for displaying an image, comprising:

memory means for storing a plurality of image features and a plurality of first image data characteristics, each of said first image data characteristics being associated with one of said image features such that there is an objective relationship predetermined as a standard value between said one image feature and said associated first image data characteristic;

means for defining at least one subjective property for each of said first image data characteristics, said subjective property defines a subjective characteristic of an image feature;

means for assigning one of a plurality of second image data characteristics to each of said image features on the basis of a value selected for said subjective property defined for each of said first image data characteristics;

rendering means for rendering each of said image features on the basis of said assigned second characteristic, thereby rendering an image; and display means for displaying an image of said image features rendered by said rendering means.

19. An apparatus according to claim 18, further including scanning means for scanning a physical image, thereby to derive at least some of said plurality of second image data characteristics.

20. An apparatus according to claim 18 further including additional memory means for storing at least some of said plurality of second image data characteristics.

* * * * *